United States Patent
Oku

(10) Patent No.: US 9,421,462 B2
(45) Date of Patent: *Aug. 23, 2016

(54) STORAGE MEDIUM STORING A GAME PROGRAM, GAME APPARATUS AND GAME CONTROLLING METHOD

(71) Applicant: Nintendo Co., Ltd., Kyoto (JP)

(72) Inventor: Masahiro Oku, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 105 days.

This patent is subject to a terminal disclaimer.

(21) Appl. No.: 14/470,127

(22) Filed: Aug. 27, 2014

(65) Prior Publication Data

US 2014/0364241 A1 Dec. 11, 2014

Related U.S. Application Data

(63) Continuation of application No. 12/549,634, filed on Aug. 28, 2009, now Pat. No. 8,852,003.

(30) Foreign Application Priority Data

Dec. 22, 2008 (JP) .................. 2008-325441

(51) Int. Cl.
  *A63F 9/24* (2006.01)
  *A63F 13/00* (2014.01)
  (Continued)

(52) U.S. Cl.
  CPC ............. *A63F 13/213* (2014.09); *A63F 13/655* (2014.09); *G06K 9/00248* (2013.01); *A63F 2300/1093* (2013.01); *A63F 2300/6045* (2013.01)

(58) Field of Classification Search
  CPC ................................ A63F 2300/1087
  See application file for complete search history.

(56) References Cited

U.S. PATENT DOCUMENTS

| 4,710,873 A | 12/1987 | Breslow et al. |
| 5,479,529 A | 12/1995 | Nakagawa et al. |

(Continued)

FOREIGN PATENT DOCUMENTS

| JP | 06-168314 | 6/1994 |
| JP | 07-155467 | 6/1995 |

(Continued)

OTHER PUBLICATIONS

Japanese Office Action dated Jun. 11, 2013 corresponding to JP Application No. 2008-325441.

*Primary Examiner* — Kevin Y Kim
(74) *Attorney, Agent, or Firm* — Nixon & Vanderhye, P.C.

(57) ABSTRACT

A game apparatus includes an inward camera, and a skin color is extracted from an imaged image imaged by the inward camera. During execution of the game, it is determined whether or not a skin color region being above a predetermined ratio is detected at a specific region. If the skin color region is above the predetermined ratio, it is determined the face of a user is correctly recognized, and feature points are detected from the imaged image. By detecting whether or not the entire face of the user is recognized, by detecting a part of the face or its movement, on the basis of the feature points, the game is progressed depending on whether or not a predetermined condition is satisfied. However, if the skin color is equal to or less than the predetermined ratio, it is determined that the face of the user is not correctly recognized, and a determination based on the feature points is not performed.

9 Claims, 18 Drawing Sheets

(51) Int. Cl.
  *G06F 17/00* (2006.01)
  *G06F 19/00* (2011.01)
  *A63F 13/213* (2014.01)
  *A63F 13/655* (2014.01)
  *G06K 9/00* (2006.01)

(56) References Cited

U.S. PATENT DOCUMENTS

| | | | |
|---|---|---|---|
| 6,035,074 A * | 3/2000 | Fujimoto | G06K 9/00228 |
| | | | 382/118 |
| 6,111,580 A | 8/2000 | Kazama et al. | |
| 7,454,056 B2 | 11/2008 | Hayaishi | |
| 2001/0000025 A1 | 3/2001 | Darrell et al. | |
| 2002/0022521 A1* | 2/2002 | Idaka | A63F 13/10 |
| | | | 463/42 |
| 2002/0042299 A1 | 4/2002 | Soltys et al. | |
| 2005/0138617 A1* | 6/2005 | Friedman | G06F 9/4411 |
| | | | 717/174 |
| 2006/0287079 A1 | 12/2006 | Nonaka et al. | |
| 2008/0200247 A1 | 8/2008 | Yoshizawa | |
| 2008/0215975 A1 | 9/2008 | Harrison et al. | |

FOREIGN PATENT DOCUMENTS

| | | |
|---|---|---|
| JP | 09-131464 | 5/1997 |
| JP | 2003-248837 | 9/2003 |
| JP | 2004-361989 | 12/2004 |
| JP | 2005-318523 | 11/2005 |
| JP | 2006-202181 | 8/2006 |
| JP | 2006-215947 | 8/2006 |
| JP | 2008-242597 | 10/2008 |

* cited by examiner

FIG. 2
(A) TOP VIEW (FOLDED MANNER)
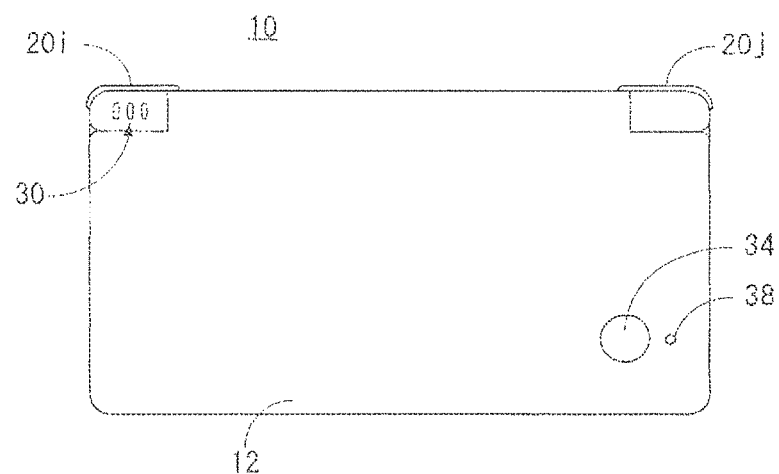
(B) LEFT SIDE VIEW (FOLDED MANNER)
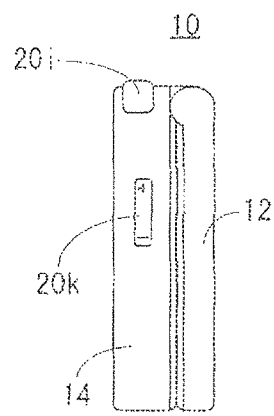

FIG. 4
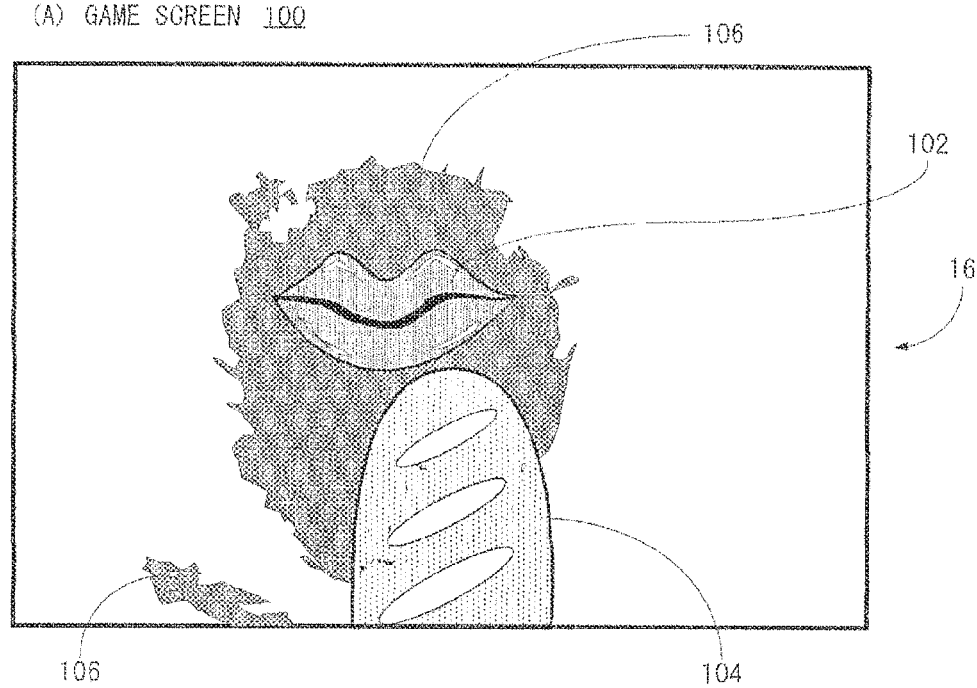
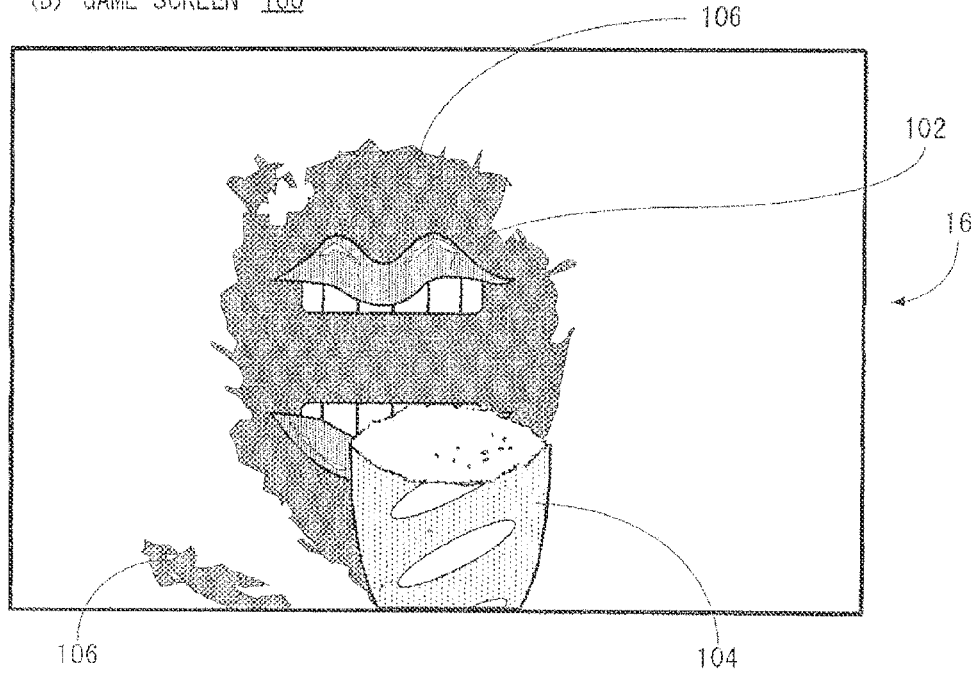

FIG. 8
(A) GAME SCREEN 200
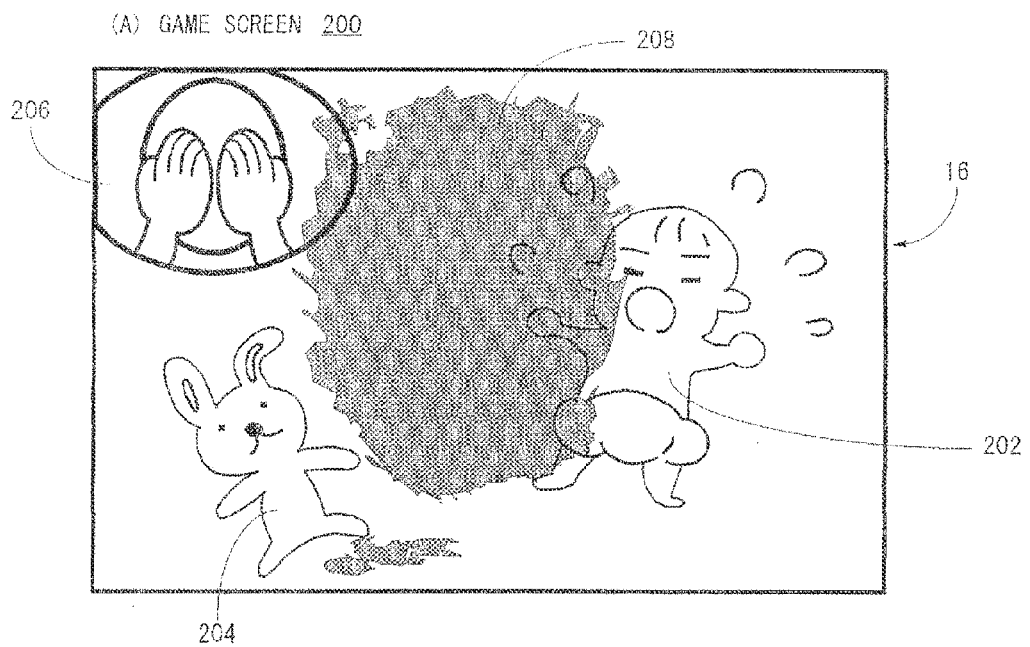
(B) GAME SCREEN 200
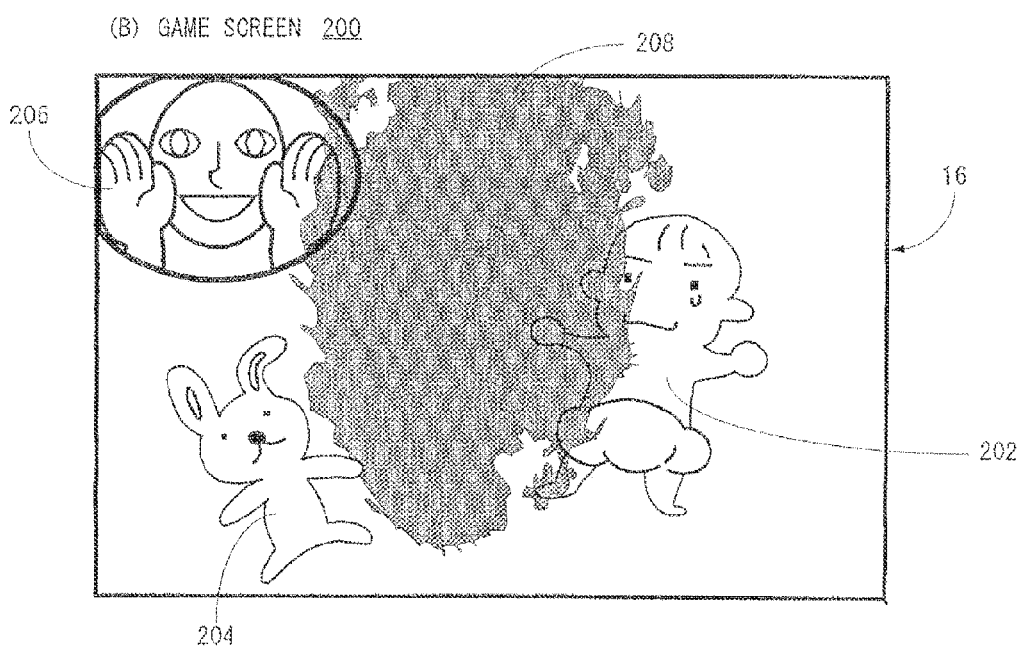

FIG. 10
(A) ADJUSTMENT SCREEN 300
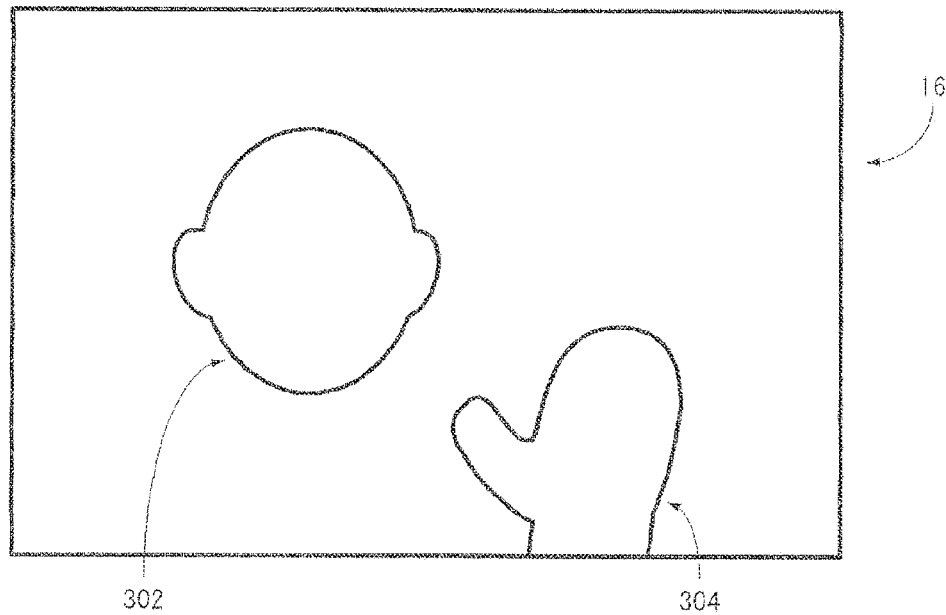
(B) EXAMPLE OF DATA FOR DETERMINATION
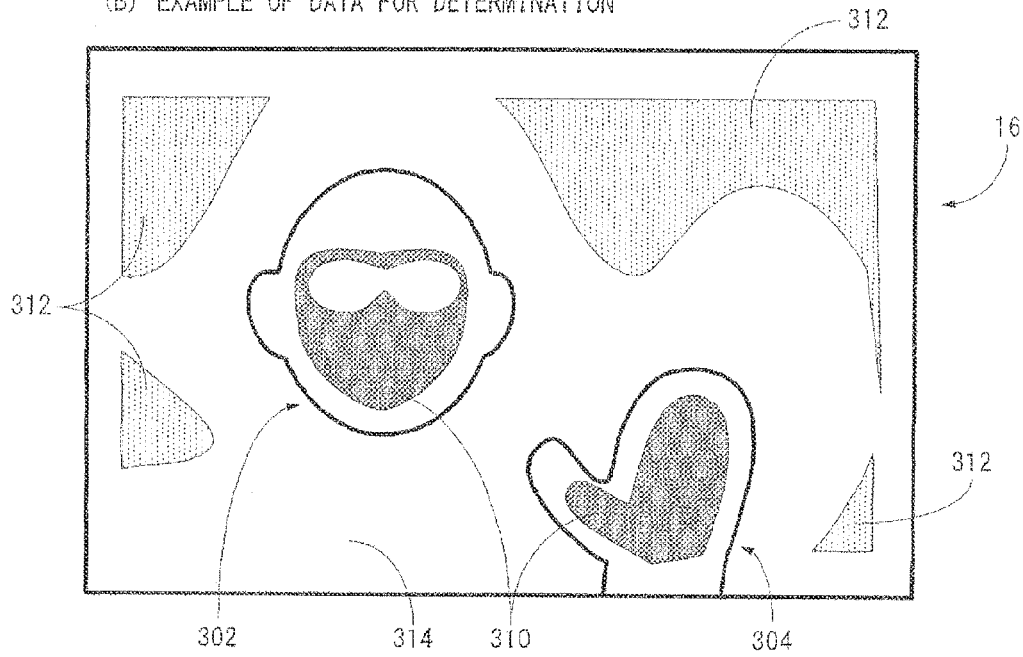

FIG. 12

THRESHOLD VALUES FOR SKIN COLOR DETERMINATION

|  | INITIAL VALUE | MINIMUM VALUE | MAXIMUM VALUE |
|---|---|---|---|
| HUE LOWER LIMIT | 220 | 210 | 230 |
| HUE UPPER LIMIT | 25 | 21 | 30 |
| SATURATION LOWER LIMIT | 17 | 10 | 30 |
| SATURATION UPPER LIMIT | 114 | 60 | 213 |
| BRIGHTNESS LOWER LIMIT | 15 | 7 | 68 |
| BRIGHTNESS UPPER LIMIT | 180 | 152 | 232 |

FIG. 13
(A) 8×8 PIXELS
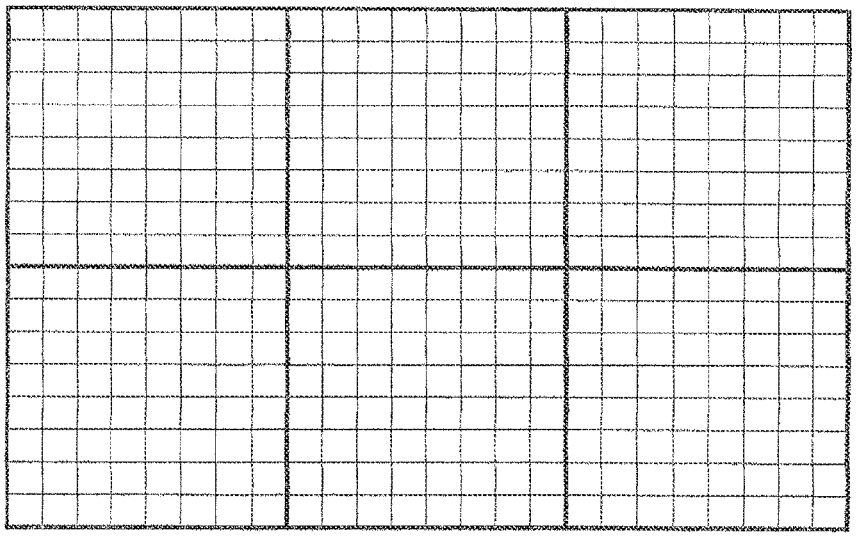
(B) 4×4 PIXELS
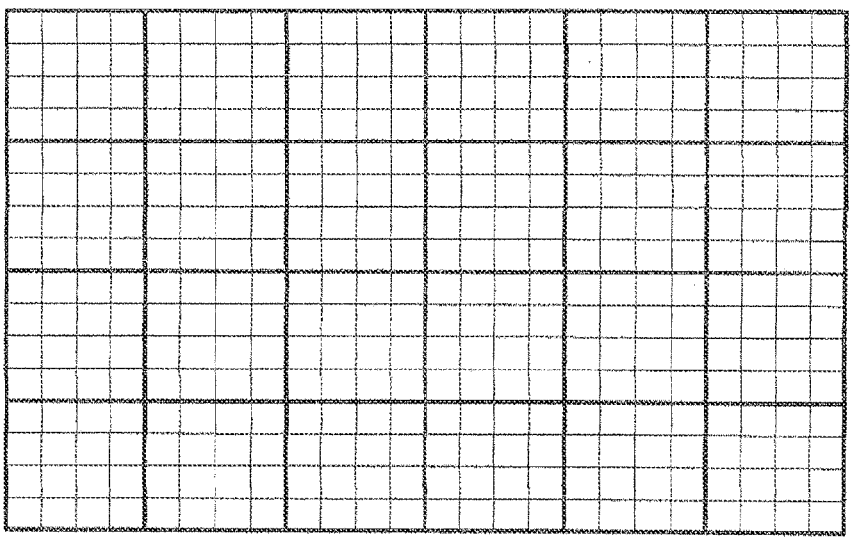

FIG. 15

(A) MATRIX SURROUNDED BY ONE MATRIX (3×3 MATRIX)

| (1) 0 | (2) 10 | (3) 0 |
|---|---|---|
| (4) 10 | (5) 24 | (6) 10 |
| (7) 0 | (8) 10 | (9) 0 |

*NUMBERS IN MATRIX ARE WEIGHTING FACTORS (B) EXAMPLE OF DETERMINATION RESULTS BASED ON THRESHOLD VALUE

| (1) × | (2) × | (3) ○ |
|---|---|---|
| (4) × | (5) ○ | (6) ○ |
| (7) × | (8) ○ | (9) × |

○ : WITHIN THRESHOLD VALUE
× : OUT OF THRESHOLD VALUE

FIG. 17

| DATA MEMORY AREA 92 | |
|---|---|
| IMAGE DATA | 92a |
| IMAGED DATA | 92b |
| FEATURE POINT DATA | 92c |
| UPPER LIP EXTRACTED COORDINATE DATA | 92d |
| LOWER LIP EXTRACTED COORDINATE DATA | 92e |
| LEFT EYE EXTRACTED COORDINATE DATA | 92f |
| RIGHT EYE EXTRACTED COORDINATE DATA | 92g |
| LIPS DIFFERENCE DATA | 92h |
| EYES DIFFERENCE DATA | 92i |
| SET THRESHOLD VALUE DATA | 92j |
| DATA FOR DETERMINATION | 92k |
| HUE THRESHOLD VALUE DATA | 92m |
| SATURATION THRESHOLD VALUE DATA | 92n |
| BRIGHTNESS THRESHOLD VALUE DATA | 92p |
| ⋮ | | ized value.
STORAGE MEDIUM STORING A GAME PROGRAM, GAME APPARATUS AND GAME CONTROLLING METHOD

CROSS REFERENCE OF RELATED APPLICATION

This application is a continuation of U.S. patent application Ser. No. 12/549,634 filed Aug. 28, 2009, which claims priority to Japanese Patent Application No. 2008-325441 filed Dec. 22, 2008, each of which are incorporated herein by reference.

BACKGROUND OF THE INVENTION

1. Field of the Invention

The present invention relates to a storage medium storing a game program, a game apparatus and a game controlling method. More specifically, the present invention relates to a storage medium storing a game program, a game apparatus and a game controlling method capable of recognizing the entire or a part of the imaged face of the user, and executing game processing on the basis of the recognition result.

2. Description of the Related Art

One example of a related art is disclosed in Japanese Patent Application Laid-Open No. 2006-202181 [G06F 3/033, A63F 13/00, G06T 1/00, G06T 7/60] laid-open on Aug. 3, 2006. Image output device of this related art images a face of a user with two cameras, specifies a movement of the eyes by detecting the eyeballs and the iris from the facial image obtained by imaging, and changes a display region of an output image in correspondence with the specified movement of the eyes.

However, in the image output device of this related art, since it is assumed that the face of the user is imaged, there is a possibility that due to detection of parts other than the eyes of the user, it is determined that the movement of the eyes are specified, and the display region of the output image may be changed. Accordingly, in a case that the related art is applied to a game played by operating the imaged image of the user, there is a problem that an operation with the imaged image of the user cannot be reflected on the game processing just as the user intended.

SUMMARY OF THE INVENTION

Therefore, it is a primary object of the present invention to provide a novel storage medium storing a game program, a novel game apparatus, and a novel game controlling method.

Another object of the present invention is to provide a storage medium storing a game program, a game apparatus, and a game controlling method capable of reflecting an operation with the imaged user's image on the game processing just as the user intended.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing a game program to be executed by a computer of an apparatus executing game processing on the basis of image data indicating an image corresponding to an entire or a part of a face of a user: the game program causes the computer to execute following steps of: an imaging step for imaging the user; a face recognizing step for recognizing the entire or the part of the face of the user on the basis of the image data indicating the image imaged by the imaging step; an skin color detection determining step for determining whether or not a skin color of the user is detected on the basis of the image data indicting the image imaged by the imaging step; and a game processing step for executing game processing on the basis of information indicating the entire or the part of the face of the user recognized by the face recognizing step when the skin color detection determining step determines that the skin color of the user is detected.

In the first invention, a game program causes a computer of an apparatus (10) executing game processing on the basis of image data indicating an image corresponding to an entire or a part of a face of a user to execute following steps. An imaging step (50, S3) images the user. A face recognizing step (50, S7) recognizes the entire or the part of the face of the user on the basis of the image data indicating the image imaged by the imaging step. A skin color detection determining step (50, S3, S5) determines whether or not a skin color of the user is detected on the basis of the image data indicting the image imaged by the imaging step. A game processing step (50, S9, S15, S17, S19) executes game processing on the basis of information indicating the entire or the part of the face of the user recognized by the face recognizing step when the skin color detection determining step determines that the skin color of the user is detected ("YES" in S5).

According to the first invention, only when the skin color of the user is detected from the imaged image of the user, the game processing is executed on the basis of the information indicating the entire or the part of the face of the user, and therefore, it is possible to reflect an operation with the imaged image of the user on the game processing just as the user intended.

A second invention is according to the first invention, and the game program causes the computer to further execute a skin color region calculating step for calculating a size of the region of the skin color on the basis of the image data indicating the image imaged by the imaging step, and the skin color detection determining step determines that the skin color of the user is detected when the size of the region of the skin color calculated by the skin color region calculating step is equal to or more than a predetermined value.

In the second invention, a game program causes a computer to further execute a skin color region calculating step (50, S5). The skin color detection determining step determines that the skin color of the user is detected when the size of the region of the skin color calculated by the skin color region calculating step is equal to or more than a predetermined value.

According to the second invention, only when the size of the skin color region is equal to or more than the predetermined value, it is determined that the skin color is detected. Thus, by setting an average size of the game skin color region during playing in a state that the programmers and developers intend to a predetermined value, for example, it is possible to cause the player to play the game in a playing state as the programmers and the developers intended.

A third invention is according to the second invention, and the skin color region calculating step calculates a ratio of the region of the skin color to the image imaged by the imaging step, and the skin color detection determining step determines that the skin color of the user is detected when the ratio calculated by the skin color region calculating step is equal to or more than the predetermined value.

In the third invention, the skin color region calculating step calculates a ratio of the region of the skin color to the imaged image. The skin color detection determining step determines that the skin color of the user is detected when the ratio calculated by the skin color region calculating step is equal to or more than the predetermined value.

In the third invention as well, similar to the second invention, it is possible to cause the player to play the game in a playing state as the programmers and the developers intended.

A fourth invention is according to the second invention, and the game program causes the computer to further execute a region setting step for setting a specific region to the image imaged by the imaging step, and the skin color region calculating step calculates a size of a region of the skin color within the specific region set by the region setting step.

In the fourth invention, the region setting step (50) sets a specific region (110, 110') to the image imaged by the imaging step. Accordingly, the skin color region calculating step calculates a size of a region of the skin color within the specific region set by the region setting step, for example.

According to the fourth invention, since the specific region is set, if a place where the face of the user and the hands seem to be exist is set as a specific region, it is possible to determine whether or not the skin color is detected with relatively easy processing.

A fifth invention is according to any one of the first to the fourth inventions, and the face recognizing step recognizes the face of the user on the basis of the image data indicating the image imaged by the imaging step, and detects the skin color of the user, and the game processing step executes the game processing on the basis of the face information indicating the entire or the part of the face of the user recognized by the face recognizing step and skin color information indicating a skin color of the user when the skin color detection determining step determines that the skin color of the user is detected.

In the fifth invention, the face recognizing step recognizes the face of the user on the basis of the image data indicating the image imaged by the imaging step, and detects the skin color of the user. The game processing step executes the game processing on the basis of the entire or the part of the face of the user recognized by the face recognizing step and skin color information of the user.

According to the fifth invention, since the game processing is executed on the basis of the information indicating the skin color and the face, it is possible to advance the game on the basis of a face hiding state in which only the skin color is detected and the information indicating the face is not detected, and a face showing state in which only the skin color is detected and the information indicating the face is detected, for example.

A sixth invention is according to the first invention, and the game program causes the computer to further execute a skin color feature data calculating step for calculating skin color feature data indicating a feature of the skin color of the user on the basis of the image data indicating the image obtained by previously imaging the user, and the skin color detection determining step determines whether or not the skin color of the user is detected on the basis of the image data indicating the image imaged by the imaging step and the skin color feature data calculated by the skin color feature data calculating step.

In the sixth invention, a game program causes a computer to further execute a skin color feature data calculating step (50). The skin color feature data calculating step calculates skin color feature data (threshold value of hue, saturation, and brightness) indicating a feature of the skin color of the user on the basis of the image data indicating the image obtained by previously imaging the use. The skin color detection determining step determines whether or not the skin color of the user is detected on the basis of the image data indicating the image imaged by the imaging step and the skin color feature data calculated by the skin color feature data calculating step.

According to the sixth invention, since whether or not the skin color of the user is detected is determined on the basis of the feature of the skin color of the user obtained from the image previously imaged, if the feature of the skin color is set to be acquired prior to the game, it is possible to eliminate errors due to the skin colors different from one user to another and due to difference in when and where the game is played.

A seventh invention is according to the first invention, and the game program causes the computer to further execute a feature point data acquiring step for acquiring feature point data of the entire or the part of the face of the user on the basis of the image data indicating the image imaged by the imaging step, and a feature point data determining step for determining whether or not the feature point data acquired by the feature point data acquiring step satisfies a predetermined condition, and the game processing step executes the game processing on the basis of the information indicating the entire or the part of the face of the user recognized by the face recognizing step when the skin color detection determining step determines that the skin color of the user is detected, and the feature point data determining step determines that the feature point data satisfies a predetermined condition.

In the seventh invention, a feature point data acquiring step (50) acquires feature point data of the entire or the part of the face of the user on the basis of the image data indicating the image imaged by the imaging step. A feature point data determining step (50, S9) determines whether or not the feature point data acquired by the feature point data acquiring step satisfies a predetermined condition. The game processing step executes the game processing on the basis of the information indicating the entire or the part of the face of the user recognized by the face recognizing step when the skin color detection determining step determines that the skin color of the user is detected ("YES" in S5), and the feature point data determining step determines that the feature point data satisfies a predetermined condition ("YES" in S9).

According to the seventh invention, when the skin color of the user is detected, and it is determined that the feature point data satisfies the predetermined condition, the game processing is executed, and therefor, it is possible to execute game processing more correctly on the basis of the image of the face of the user.

An eighth invention is a game apparatus executing game processing on the basis of image data indicating an image corresponding to an entire or a part of a face of a user, and comprises: an imaging means for imaging the user; a face recognizing means for recognizing the entire or the part of the face of the user on the basis of the image data indicating the image imaged by the imaging means; an skin color detection determining means for determining whether or not a skin color of the user is detected on the basis of the image data indicting the image imaged by the imaging means; and a game processing means for executing game processing on the basis of the information indicating the entire or the part of the face of the user recognized by the face recognizing means when the skin color detection determining means determines that the skin color of the user is detected.

In the eighth invention as well, similar to the first invention, it is possible to reflect an operation with the imaged image of the user on the game processing just as the user intended.

A ninth invention is a game controlling method of a game apparatus executing game processing on the basis of image data indicating an image corresponding to an entire or a part of a face of a user, and includes steps of: (a) imaging the user; (b) recognizing the entire or the part of the face of the user on the basis of the image data indicating the image imaged by the step (a); (c) determining whether or not a skin color of the user is detected on the basis of the image data indicting the image imaged by the step (a), and (d) executing game processing on the basis of the information indicating the entire or the part of the face of the user recognized by the step (b) when the step (c) determines that the skin color of the user is detected.

In the ninth invention as well, similar to the first invention, it is possible to reflect an operation with the imaged image of the user on the game processing just as the user intended.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a top view and a left side view of a folded state of the game apparatus shown in FIG. 1;

FIG. 4 is an illustrative view showing one example of a game screen to be displayed on a first LCD shown in FIG. 1;

FIG. 8 is an illustrative view showing another example of game screens to be displayed on the first LCD in FIG. 1;

FIG. 10 is an illustrative view showing one example of an adjustment screen to be displayed on the first LCD and one example of data for determination in a case that the adjustment screen is utilized;

FIG. 12 is a table showing threshold values for a skin color determination;

FIG. 13 is an illustrative view showing matrixes in a case that the display region of the first LCD is divided into 8×8 pixels and divided into 4×4 pixels;

FIG. 15 is an illustrative view showing weighting factors for calculating an evaluated value of a certain matrix in a case that a skin color is extracted and determination results based on a threshold value;

FIG. 17 is an illustrative view showing a detailed content of the data memory region shown in FIG. 16.

DETAILED DESCRIPTION OF THE PREFERRED EMBODIMENTS

Figure 1:
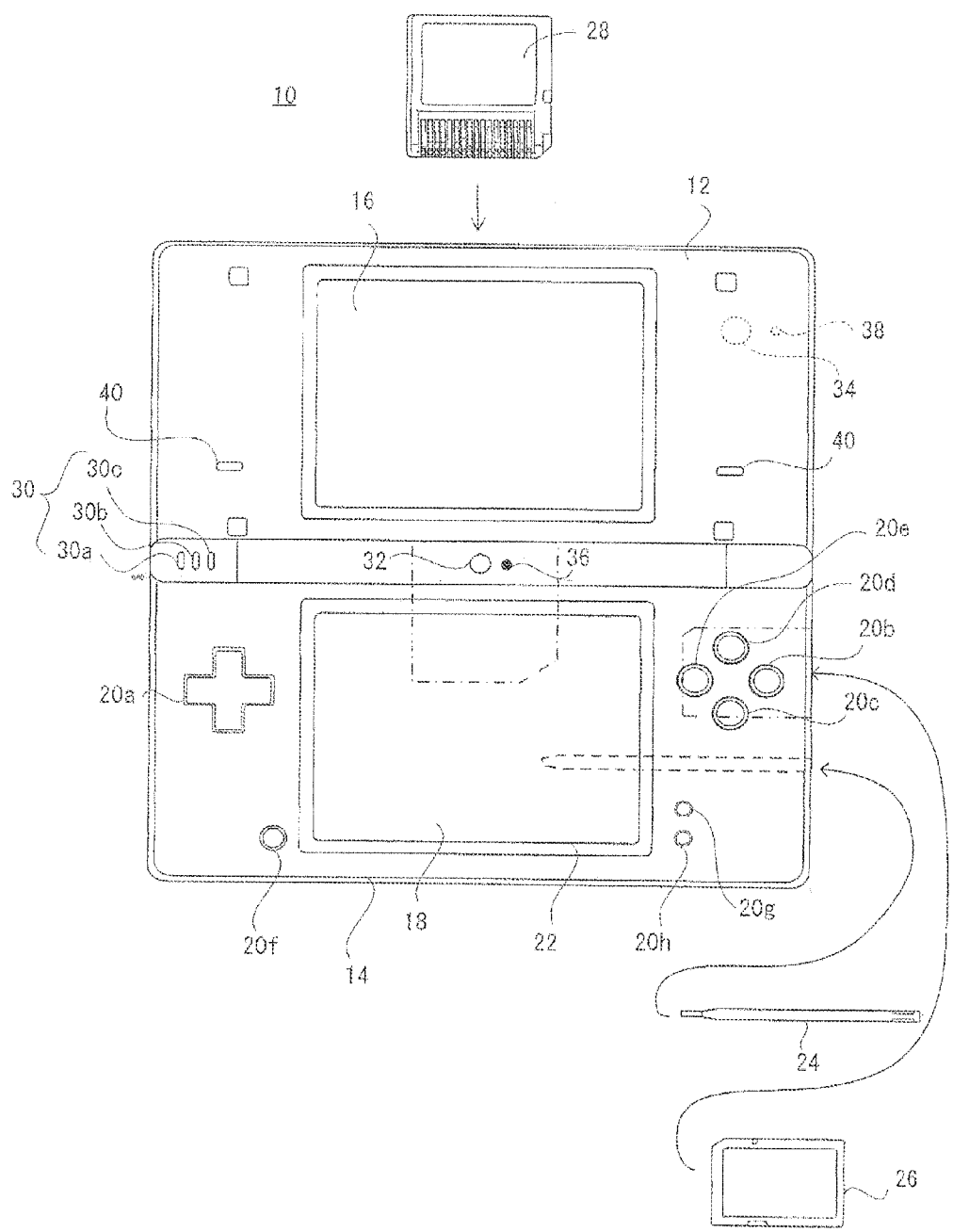
FIG. 1 is an illustrative view showing one embodiment of an external configuration of a game apparatus of this invention.

Referring to FIG. 1, a game apparatus 10 of one embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both of the hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at an arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution. Although the detail is described later, the second LCD 18 is mainly used for displaying an image which is being imaged with the inward camera 32 or the outward camera 34 (still image and moving image) in real time, displaying a game screen, and so forth.

The lower housing 14 is provided with respective operation buttons 20a-20k as an input device. As shown in FIG. 1, out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can be also used for an operation of a imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot for the touch pen 24 and the housing portion need not to be provided.

Moreover, on the right side surface of the lower housing 14, a loading slot for housing a memory card 26 (represented by a chain double-dashed line in FIG. 1) is provided. At the inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. The inside of the loading slot, a connector (not illustrated) for electrically connecting the game apparatus 10 and the memory card 28 is provided. The memory card 28 is a recording medium of recording a game program, other application programs and necessary data, and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are the opposite direction with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position of housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image and the first LCD 16 as a display means for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a display means for displaying an operation explanatory screen and a game screen. Accordingly, the game apparatus 10 has two screens (16, 18) and two kinds of operating portions (20, 22).

Figure 3:
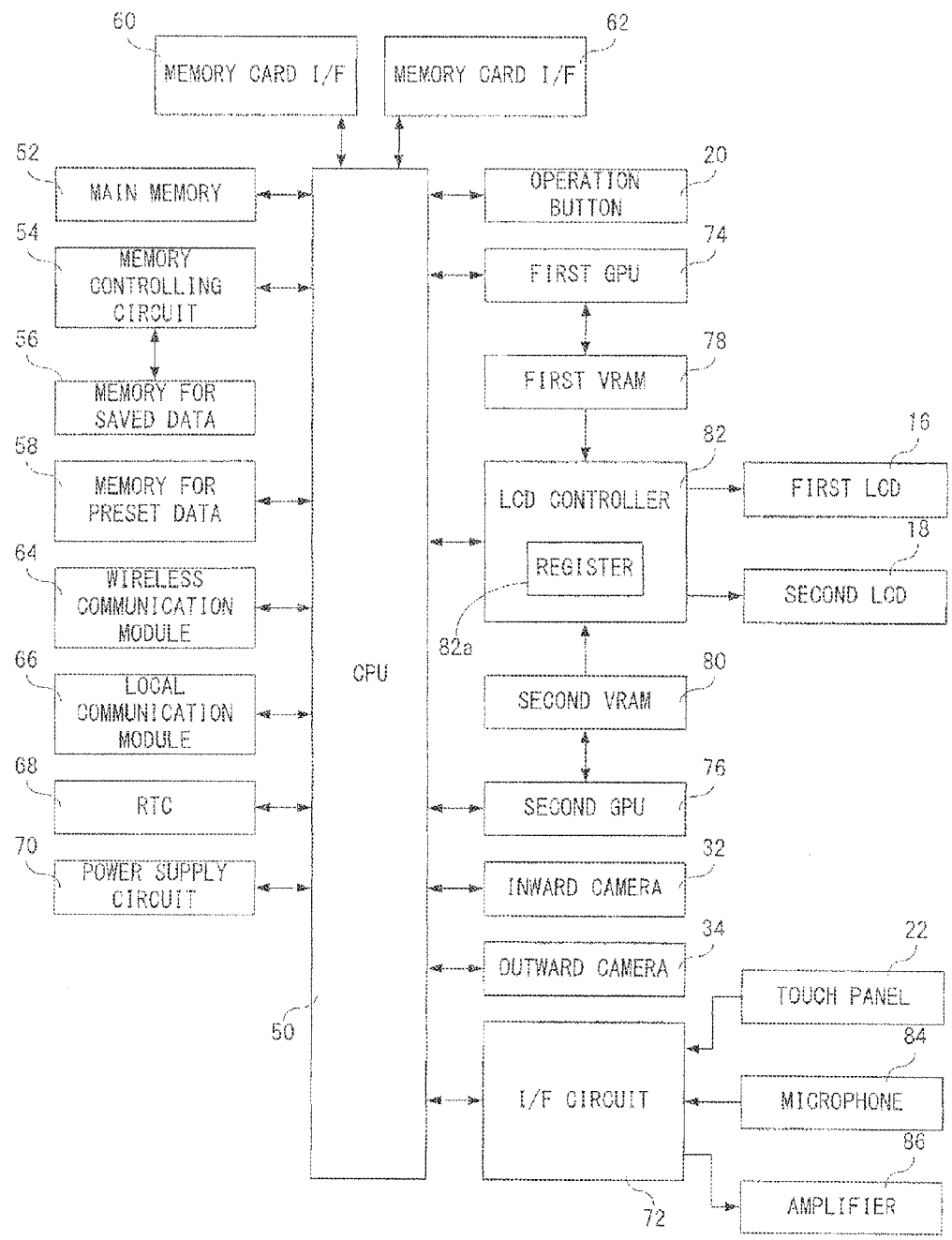
FIG. 3 is a block diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, and an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes game processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a storage means to be utilized as a work area and a buffer area of the CPU 50. That is, the main memory 52 stores (temporarily stores) various data to be utilized in the aforementioned game processing, and stores a program from the outside (memory cards 26 and 28, and another appliance). In this embodiment, as main memory 52, a PSRAM (Pseudo-SRAM) is used, for example. The memory for saved data 56 is a storage means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a storage means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 is read by the CPU 50 so as to be executed.

Here, the game program is not only supplied to the game apparatus 10 through the external storage medium, such as a memory card 28, etc. but also is supplied to the game apparatus 10 through a wired or a wireless communication line. In addition, the game program may be recorded in advance in a nonvolatile storage device inside the game apparatus 10. Additionally, as an information storage medium of storing the game program, an optical disk storage medium, such as a CD-ROM, a DVD, or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the RTC 68 and the power supply circuit 70. The RTC 68 counts a time to output the same to the CPU 50. For example, the CPU 50 can calculate a current time (date), etc. on the basis of the time counted by the RTC 68. The power supply circuit 70 controls power supplied from the power supply (typically, a battery accommodated in the lower housing 14) included in the game apparatus 10, and supplies the power to the respective circuit components within the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where the input is made.

The operation button 20 is made up of the aforementioned respective operation buttons 20a-20k, and connected to the CPU 50. The operation data indicating a input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to an instruction from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and sends the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and renders the same in the first VRAM 78. The second GPU 76 similarly generates a second display image according to an instruction form the CPU 50, and renders the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image rendered in the first VRAM 78 to the second LCD 18, and outputs the second display image rendered in the second VRAM 80 to the first LCD 16. Furthermore, in a case that the value of the register 82a is "1", the LCD controller 82 outputs the first display image rendered in the first VRAM 78 to the first LCD 16, and outputs the second display image rendered in the second VRAM 80 to the second LCD 18. In this embodiment, the CPU 50 displays a silhouette of a face (skin color region) corresponding to the image imaged by the inward camera 32 and the outward camera 34 and a game screen on the first LCD 16, and displays an operation explanatory screen and a game screen, etc. generated by predetermined processing on the second LCD 18.

Although illustration is omitted, for example, the second LCD 18 displays an imaging instruction button explanatory image, a camera switch button explanatory image, a zoom instruction button explanatory image, and a display image selection button explanatory image, etc. as the aforementioned operation explanatory screen. The imaging instruction button explanatory image is an image indicating a position of the operation button 20 for performing an imaging instruction. The camera switch button explanatory image is an image indicating a position of the operation button 20 for performing a camera switching instruction. Here, the camera switching instruction is an instruction for switching a camera for imaging between the inward camera 32 and the outward camera 34. The zoom instruction button explanatory image is an image showing a position of the operation button 20 for performing a zoom changing instruction. Here, the zoom changing instruction is an instruction for scaling the image displayed on the first LCD 16. The display image selection button explanatory image is an image indicating a position of the operation button 20 for performing a display changing instruction. Here, the display image selecting instruction is an instruction for selecting the saved image to be displayed on the first LCD 16 when the saved image saved in the game apparatus 10 is displayed on the first LCD 16.

FIG. 4 shows an example of a game screen 100 to be displayed on the first LCD 16 in a case that a virtual game (action game) is played by means of the game apparatus 10 of this embodiment. On the game screen 100 shown in FIG. 4(A) and FIG. 4(B), an object (lip object) 102 imitating lips of a person is displayed at substantially the center. Furthermore, below the lip object 102, an object (bread object) 104 imitating a loaf of bread is displayed.

In the virtual game, when the user or the player opens and closes the mouth as if he or she eats a loaf of bread, this is detected on the basis of the image imaged by the inward camera 32. According thereto, the lip object 102 displayed on the game screen 100 is opened and closed to thereby represent a situation that the bread object 104 is eaten. For example, if the bread object 104 is finished within a time limit, the game is to be cleared, but if the bread object 104 cannot be finished within the time limit, the game is to be over.

As shown in FIG. 4(A) and FIG. 4(B), the face of the user, that is, the skin color is extracted from the imaged image, and the extracted region of the skin color is displayed on the game screen 100 by a silhouette 106. In this embodiment, whether or not the face of the user is recognized, and if the face of the user is recognized, whether or not the size (distance between the game screen 100 (inward camera 32) and the face of the user) is proper are notified to the user according to the shape and size of the silhouette 106.

Figure 5:
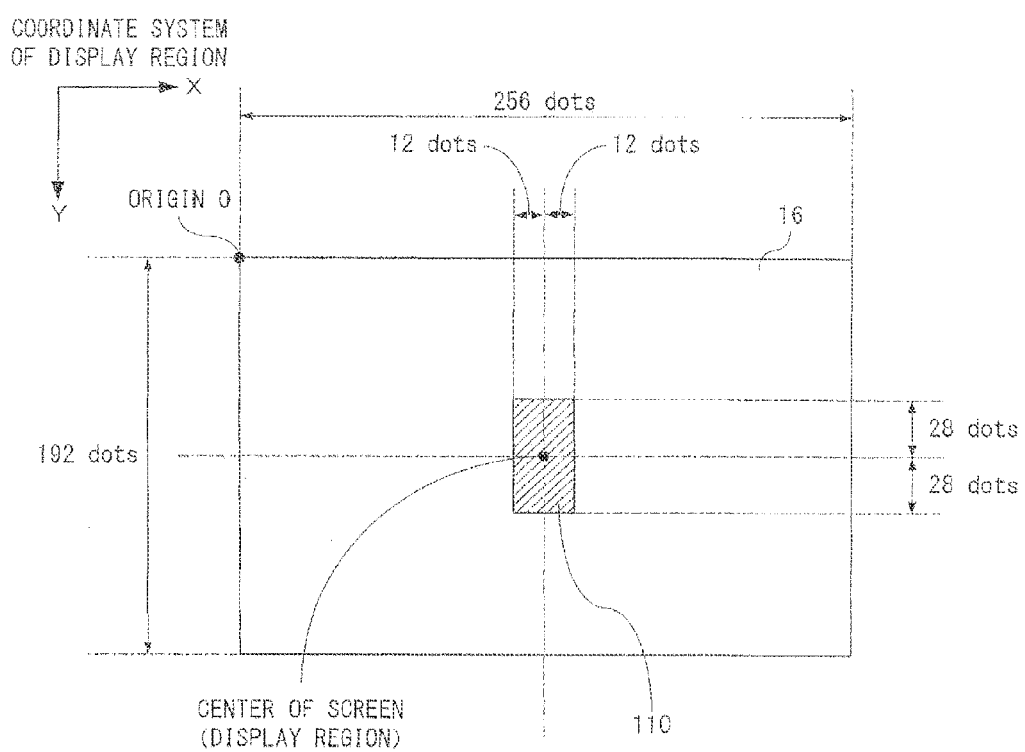
FIG. 5 is an illustrative view showing a skin color determining region to be set on a display region when a virtual game utilizing the game screens shown in FIG. 4 is played.

Additionally, as shown in FIG. 4 and FIG. 5, if the recognized face of the user is substantially an oval figure, and has a size to fit within the game screen (100, 200), it can be said that the face of the user is an orientation or a state intended by a developer or a programmer.

However, in this embodiment, as shown in FIG. 5, a specific region 110 is first set to the display region of the first LCD 16. Then, the specific region 110 is detected as to whether the skin color or not in units of 4 pixels (every matrix of 2×2). Out of the total number of the matrixes (24×56÷4=338 in this embodiment), depending on whether or not the ratio of the skin color to the detected number of matrixes is above a predetermine value (35%, for example), it is determined that the face of the user is correctly recognized (skin color determining processing). That is, it is determined whether or not the position of the face of the user (head) (forward and backward direction and right and left position) with respect to the game screen (the first LCD 16) or the inward camera 32 is a position appropriate for a playing state as intended by the programmer or the developer, et al.

It should be noted that a method of extracting a skin color from the imaged image (skin color extracting processing) is explained below in detail. Similarly, threshold value adjusting processing used for the skin color extracting processing is explained in detail later.

Noted, as shown in FIG. 5, the coordinate system of the first LCD 16 is a coordinate system in which the vertex of the upper left of the display region is set as an origin O, and a right direction of the drawing is a plus direction of the X-axis, and a downward direction of the drawing is a plus direction of the Y-axis. This holds true for the later in this embodiment.

That is, it is determined whether or not there is a face of the user at substantially the center of the screen. Here, if the face of the user does not exist at substantially the center of the screen, by determining that the mouth of the user is not in the vicinity of the bread object 104 also, the opening and closing of the mouth is not detected. On the other hand, if the face of the user is substantially the center of the screen, by determining that the mouth of the user exists in the vicinity of the bread object 104, the opening and closing the mouth is detected.

By taking the center of the screen (display region) of the first LCD 16 as a reference, the specific region 110 is defined by a rectangle with a width of 12 pixels (dots) right and left from the center and a length of 28 pixels up and down from the center. However, this is one example, and the position and size (shape) of the specific region 110 can be arbitrarily set depending on the kind of the game.

Furthermore, during the game, feature points of the user are detected from the image imaged by the inward camera 32, and on the basis of the feature points, the face of the user is recognized, and a special expression (movement of the face) of the user is detected. However, the reason why the face of the user is recognized based on the feature points as well as the skin color region is to prevent a malfunction of erroneously recognizing the skin color region except for the face as a face.

Figure 6:
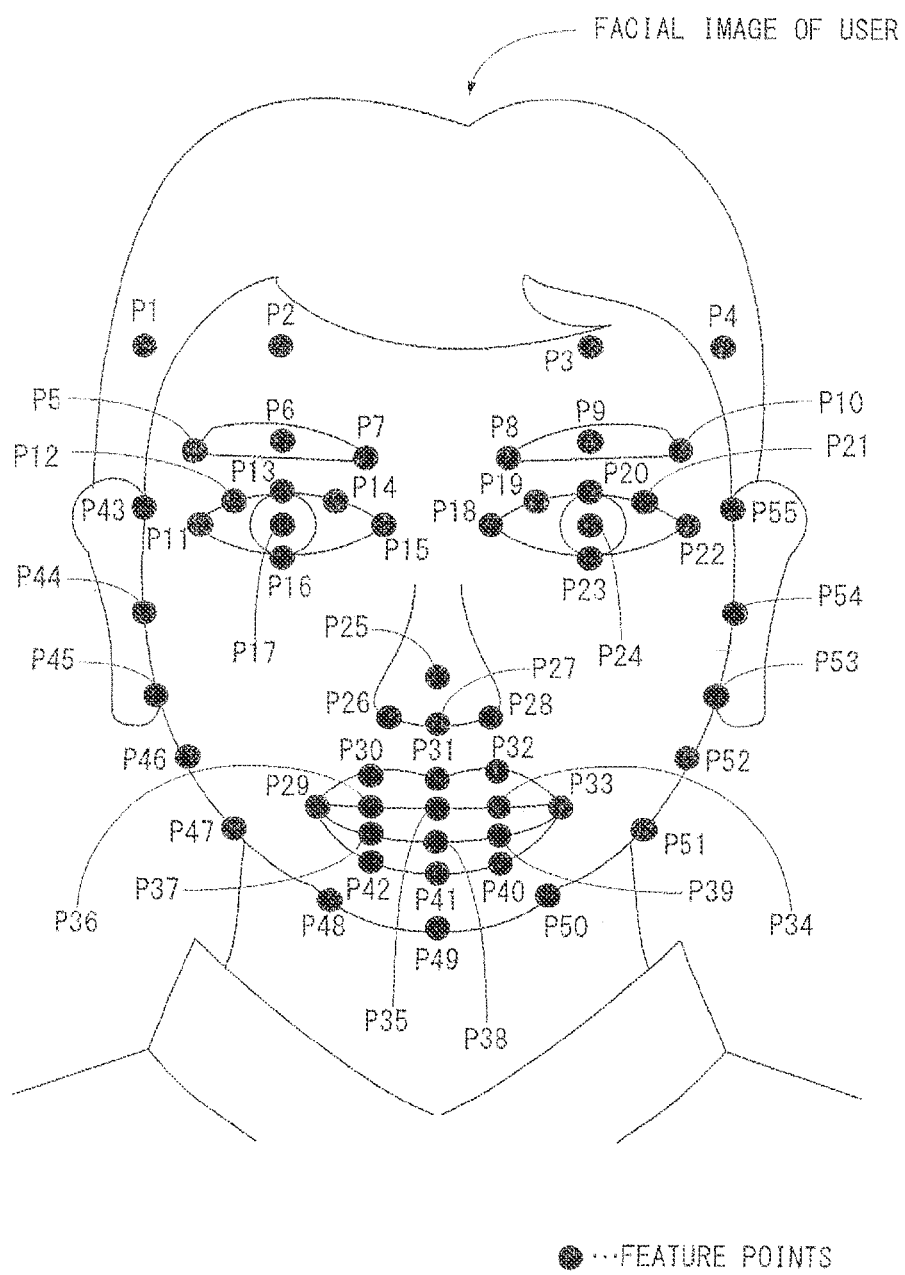
FIG. 6 is an illustrative view showing feature points detected from a facial image of a user.
Figure 7:
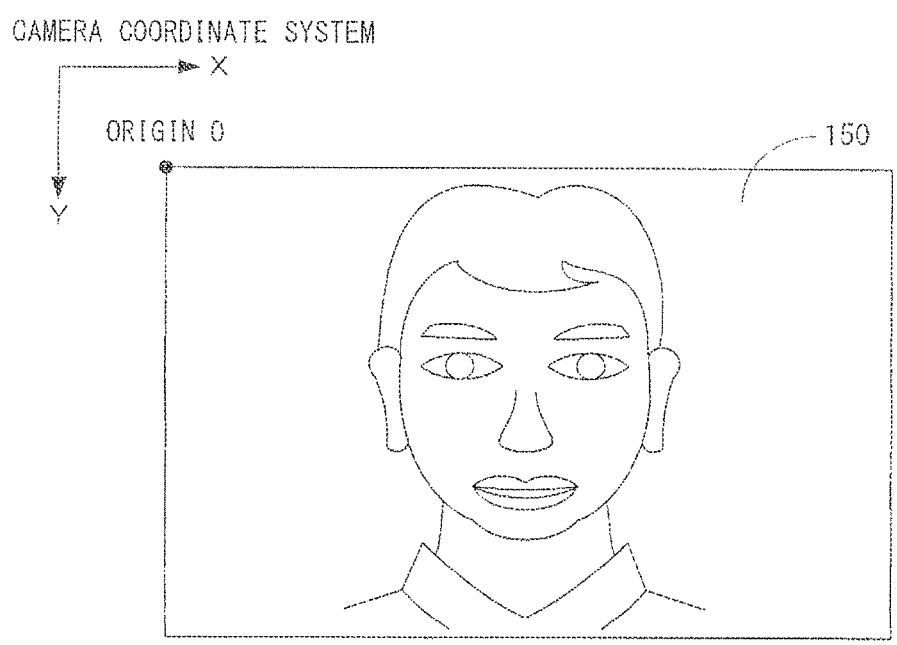
FIG. 7 is an illustrative view showing a development region of an imaged image imaged by a camera shown in FIG. 1.

Here, determination processing of opening and closing the mouth is explained in detail. FIG. 6 is an illustrative view showing a facial image of the user imaged by the inward camera 32, and the feature points Pi (i=1, 2, . . . , 54, 55). Here, as shown in FIG. 7, the image developed in the main memory 52 is shown by the camera coordinate system, and the region (development region) 150 on which the image is developed is reserved in the main memory 52 with a size equivalent to the size of the display region of the first LCD 16. The vertex of the upper left of the development region 150 is the origin O of the camera coordinate. In the camera coordinate system, the right direction of the drawing is a plus direction of the X-axis, and the downward direction of the drawing is a plus direction of the Y-axis. Furthermore, the facial images shown in FIG. 6 and FIG. 7 are the facial images of the user imaged by the inward camera 32, and a mirror image of the facial image is developed in the development region 150.

Here, in FIG. 7, for the sake of illustration, the feature points Pi shown in FIG. 6 are omitted, and only the facial image is described.

First, out of the feature points Pi, a coordinate (LipU_X, LipU_Y) of a midpoint (midpoint of the upper lip) LipU between a coordinate (X1, Y1) of a feature point P31 at the center of the upper side of the upper lip and a coordinate (X2, Y2) of feature point P35 at the center of the lower side of the upper lip, and a coordinate (LipD_X, LipD_Y) of the midpoint (midpoint of the lower lip) LipD between a coordinate (X3, Y3) of a feature point P38 at the center of the upper side of the lower lip and a coordinate (X4, Y4) of a feature point P41 at the center of the lower side of the lower lip are calculated. Furthermore, the difference (difference of the lips) (Lip_dX, Lip_dY) between the two midpoints LipU, LipD is calculated for each of the axial directions. Here, the difference (Lip_dX, Lip_dY) of the lips is an absolute value, and calculated according to Equation 1.

$$Lip\_dX = |LipU\_X - LipD\_X|$$

$$Lip\_dY = |LipU\_Y - LipD\_Y| \qquad \text{[Equation 1]}$$

Furthermore, out of the feature points Pi, a coordinate (EyeL_X, EyeL_Y) of the midpoint (the midpoint of the left eye) EyeL between a coordinate (X5, Y5) of the feature point P17 of the center of the left eye (the center of the pupil) and a coordinate (X6, Y6) of a feature point P13 of the center of the upper side of the left eye (the center of the upper eyelid) is calculated. Similarly, out of the feature points Pi, a coordinate (EyeR_X, EyeR_Y) of the midpoint (the midpoint of the right eye) EyeR between a coordinate (X7, Y7) of a feature point P24 at the center of the right eye (the center of the pupil) and a coordinate (X8, Y8) of a feature point P20 at the center of the upper side of the right eye (the center of the upper eyelid) is calculated. Furthermore, a difference (the difference of the eyes) (Eye_dX, Eye_dY) between these two midpoints EyeL, EyeR is calculated for each axial directions. Here, the difference of the eyes (Eye_dX, Eye_dY) is an absolute value, and is calculated according to Equation 2.

$Eye\_dX=|EyeL\_X-EyeR\_X|$ $Eye\_dY=|EyeL\_Y-EyeR\_Y|$ [Equation 2]

Succeedingly, it is determined whether or not Equation 3-Equation 7 are satisfied. This is because a case that the game is played in a manner different from a playing state that the developer or the programmer assumes is excluded. Here, "||" means or (∪).

$(LipU\_X<16||LipU\_X>240||LipU\_Y<16||LipU\_Y>176)$ $(LipD\_X<16||LipD\_X>240||LipD\_Y<16||LipD\_Y>176)$ $(EyeL\_X<16||EyeL\_X>240||EyeL\_Y<16||EyeL\_Y>176)$ $(EyeR\_X<16||EyeR\_X>240||EyeR\_Y<16||EyeR\_Y>176)$ [Equation 3]

$Lip\_dX>64$ [Equation 4]

$Lip\_dY>96$ [Equation 5]

$Eye\_dX>96$ [Equation 6]

$Eye\_dY>24$ [Equation 7]

If any one of the Equation 3-Equation 7 is satisfied, it is determined to be an erroneous detection or that this is not a playing state that the developer, et al. assumes, and the current mouth-opening-and-closing determining processing is made invalid. More specifically, if any one of the conditions in Equation 3 is satisfied, it is determined that the feature points Pi are too close toward a side of the screen. That is, the lips and the eyes of the user are too close toward the end of the screen. In such a case, it is determined to be an erroneous detection or this is not a playing state that the developer, et al. assumes.

If the Equation 4 is satisfied, it is determined that the upper and lower lips are greatly off horizontally. In such a case, it is determined to be an erroneous detection, or this is not a playing state that the developer, et al. assumes such as the face of the user being too close toward the screen (the first LCD 16). Furthermore, if the Equation 5 is satisfied, it is determined that the upper and lower lips are too opened vertically. In such a case, it is determined to be an erroneous detection, or this is not a playing state that the developer, et al. assumes such as the face of the user being too close toward the screen (the first LCD 16).

If the Equation 6 is satisfied, it is determined that the right and left eyes are too far from each other. In such a case, it is determined to be an erroneous detection, or this is not a playing state that the developer, et al. assumes such as the face of the user being too close toward the screen (the first LCD 16). Furthermore, if the Equation 7 is satisfied, it is determined that the right and left eyes are greatly off vertically. In such a case, it is determined to be an erroneous detection, or this is not a playing state that the developer, et al. assumes such as the face of the user being too close toward the screen (the first LCD 16).

In a case that the face of the user (skin color region) is correctly recognized by the skin color determining processing, and neither Equations 3 to 7 described above is satisfied, by determining that this is a playing state that the developer, et al. intends, that is, that the mouth is opened or closed. If Equation 8 is satisfied, it is determined that the user closes the mouth while if Equation 9 is satisfied, it is determined that the user opens the mouth. Here, if it is determined that the user opens the mouth and then closes it, the bread object 104 is eaten by the lip object 102 once.

$Lip\_dY<16$ [Equation 8]

$Lip\_dY\geq16$ [Equation 9]

In this manner, in the game shown in FIG. 4(A) and FIG. 4(B), when it is determined that the silhouette 106 of the face of the user (skin color region) is in the vicinity of the bread object 104 by the skin color determining processing, it is determined whether a playing state that the developer, et al. assumes or not on the basis of the feature points Pi. In a case of the playing state that the developer, et al. assumes, it is further determined whether or not the user opens and closes the mouth on the basis of the feature points Pi. Then, when it is determined that the user opens and closes the mouth, a game screen 100 (not illustrated) in which the loaf of bread is eaten is displayed on the first LCD 16 in response thereto. Accordingly, for example, a game screen 100 is displayed, in which in a state shown in FIG. 4(A), the lip object 102 is opened or closed and the bread object 104 is bitten by the lip object 102, and as shown in FIG. 4(B), a situation in which a part of the bread object 104 is lost.

Here, in the game screen 100 shown in FIG. 4(B), when it is detected that the mouth of the user is further opened or closed after the bread object 104 is bitten, a situation in which the lip object 102 is going to open and bite the bread object 104 is shown.

In this embodiment, since the loaf of bread is separately eaten by plurality of numbers of times (twice, for example), if a plurality number of times of closing and opening the mouth by the user are detected within the time limit, in accordance with the bread object 104 being totally lost, that is, in accordance with a predetermined purpose being attained, the game is to be cleared. However, if a plurality number of times of closing and opening the mouth are not detected within the time limit, the bread object 104 is not lost, that is, the predetermined purpose is not attained, so that the game is to be over.

FIG. 8(A) and FIG. 8(B) shows an example of game screens 200 of another virtual game (action game). As shown in FIG. 8(A), at nearly the center of the game screen 200, an object 202 imitating a baby (baby object) is displayed, and at the left of it, an object 204 of a plushie of a rabbit (plushie object) is displayed. Furthermore, a designation image displaying area 206 for instructing a motion to be currently performed by the user (by means of gestures) is displayed at the upper left of the game screen 200. Then, on the game screen 200, a silhouette 208 of a face of the user (skin color region) is displayed.

In the virtual game utilizing the game screen 200 shown in FIG. 8(A) and FIG. 8(B), when the user succeeds in a motion of a so-called "peek-a-boo" within a time limit, it is possible to cradle the baby object 202, so that a predetermined purpose is attained, and the game is cleared. However, when the user fails in a motion of "peek-a-boo", and the time limit expires, that is, when it is impossible to cradle the baby object 202 within the time limit, the game is to be over.

In such a virtual game, it is determined whether or not the face of the user is correctly recognized by the skin color determining processing, and if the face is correctly recognized, by recognizing a part of the face of the user on the basis of the feature points Pi of the face of the user, a motion of "peek-a-boo" is detected.

Figure 9:
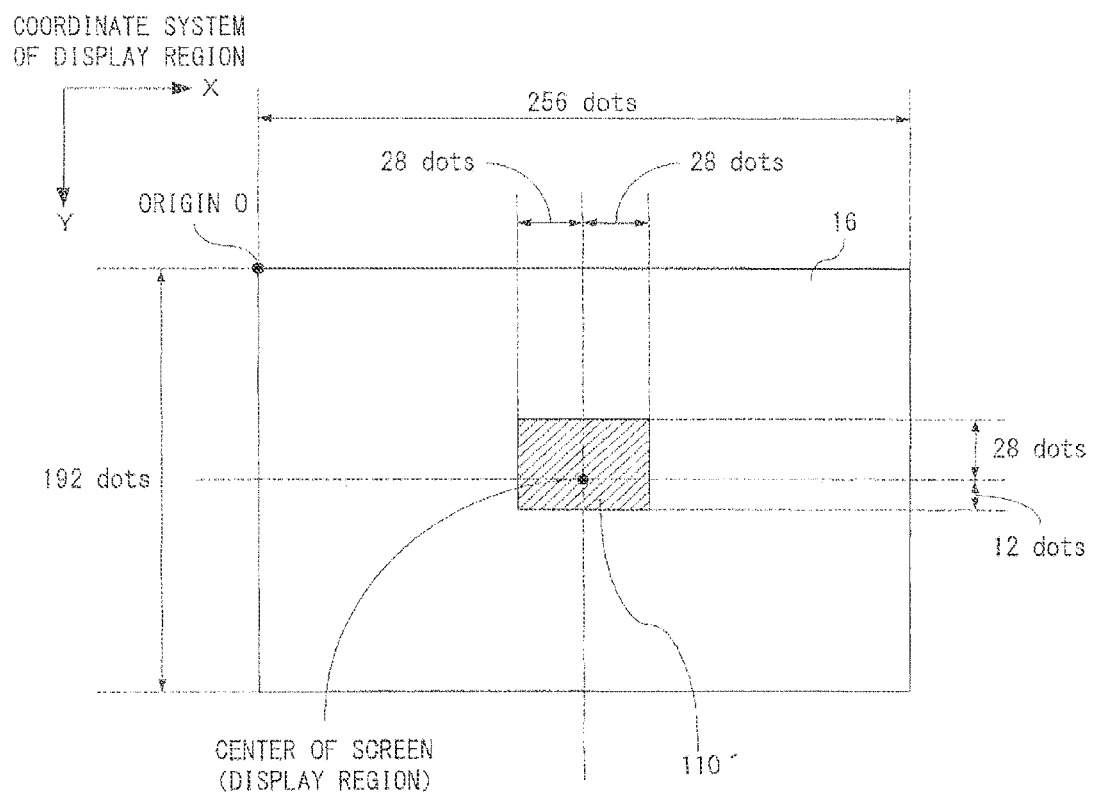
FIG. 9 is an illustrative view showing a skin color determining region to be set to the display region in a case that the virtual game by utilizing the game screens shown in FIG. 8 is played.

First, in the virtual game, the skin color determining processing is performed as described above, but a specific region 110' different in size (range) from the specific region 110 shown in FIG. 5 is set. More specifically, as shown in FIG. 9, by taking the center of the screen (display area) of the first LCD 16 as a reference, the specific region 110' is set to have 28 pixels right and left, 28 pixels upward, and 12 pixels downward. This is because that when the user covers his or her own face with the hands, the "peek-a-boo" motion is different in users, that is, some user hide only the eyes, and other users hide the eyes, the nose, and the mouth.

Also, the reason why the skin color region is determined is that when the face of the user is viewed, the skin color is distributed more or less at the center of the screen of the first LCD 16, and since it is assumed that the face is covered with the bare hands, it is considered that the skin color is distributed in a case that the face is covered with the bare hands as well.

Furthermore, the reason why such a skin color region determination is used is that when the face is recognized with only the feature points Pi, by moving the face to the outside of the screen (the place which cannot be imaged by the inward camera 32), and causing the face not to be imaged, a situation the same as the situation where the face is covered with the hands (that is, a state that the feature points Pi cannot be detected) is made, and such a playing state is not the state intended by the developer, et al.

Such skin color determining processing is the same as that explained by means of FIG. 5. That is, whether or not the specific region 110' is a skin color by a unit of 2×2 pixel matrix, and depending on whether or not a ratio of the number of matrixes in which the skin color is detected to the total number of matrixes (56×40÷4=560 in this embodiment) is equal to or more than a predetermined valued (35%, for example), whether or not the face of the user is correctly recognized is determined.

When a state that the user covers the face is detected by the skin color determining processing, the midpoints EyeL, EyeR are respectively calculated with respect to the left and the right eyes on the basis of the feature points Pi as described above, and the difference (Eye_dX, Eye_dY) is calculated. The feature point Pi and Equations (Equation1, Equation 2) used for these calculations are as described above, so that the duplicated explanation is omitted.

Next, it is determined whether or not Equation 10 is satisfied. If three or more out of the four conditions in the Equation 10 are satisfied, it is determined that the face of the user can be detected at a size and a position at which the programmer, et al. intends. Here, "&&" means and (∩).

$(EyeL\_X>16$ && $EyeL\_X<240)$ $(EyeL\_Y>16$ && $EyeL\_Y<176)$ $(EyeR\_X>16$ && $EyeR\_X<240)$ $(EyeR\_Y>16$ && $EyeR\_Y<176)$ [Equation 10]

Whether or not the user covers (hides) the face with the hands is determined on the basis of a state that the face of the user is detected and a state that the face of the user is not detected. In this embodiment, the determination is made by means of an evaluated value (variable EV). Here, the variable EV is an integer varying from 0 to 100. Furthermore, the variable EV is varied such that as the variable EV is close to 0, it is evaluated that the face of the user is not hidden, and as the variable EV is close to 100, it is evaluated that the face of the user is hidden.

At the beginning of the evaluation as to whether or not the user hides the face, the variable EV is set to 0. During a time from when the evaluation is started to when the face of the user is hidden, when a state that the face can be detected is detected, the variable EV is subtracted according to Equation 11, and when a state that the face cannot be detected is detected, the variable EV is added according to Equation 12. Here, as described above, the variable EV is varied so as not to exceed the lower limit 0 and upper limit 100. Furthermore, the subtracted value and the added value are values empirically obtained, but there is no need of being restricted to these values.

$EV=EV-12$ [Equation 11]

$EV=EV+16$ [Equation 12]

According to the Equation 11 and the Equation 12, the variable EV is varied, and when the variable EV, that is, when the evaluated value is above a predetermined value (70 in this embodiment), it is determined that the user hides the face. Succeedingly, during a time from when the user hides the face to when the user shows the face, when a state that the face can be detected is detected, the variable EV is subtracted according to Equation 13, and when a state that the face cannot be detected is detected, the variable EV is added according to Equation 14. Here, as described above, the variable EV is varied so as not to exceed the lower limit 0 and the upper limit 100. Furthermore, the subtracted value and added value are values empirically obtained, and there is no need of being restricted to them.

$EV=EV-16$ [Equation 13]

$EV=EV+14$ [Equation 14]

According to the Equation 13 and Equation 14, the variable EV is varied, and when the variable EV, that is, the evaluated value is equal to or less than a predetermined value (30 in this embodiment), it is determined that the user shows the face.

Thus, when the user hides the face and then shows the face, it is determined that a motion of "peek-a-boo" is successful. As described above, if the user succeeds in the motion of "peek-a-boo" within the time limit, it is possible to cradle the baby object 202, so that the game is to be cleared.

In both of the virtual games shown in FIG. 4 and FIG. 8, the skin color determining processing is executed. Here, the skin color has an individual difference for each user, and changed depending on the environment, when to play the game and where to play the game, and therefore, a threshold value to be utilized for processing of extracting a skin color from the imaged image (hue lower limit, hue upper limit, saturation lower limit, saturation upper limit, brightness lower limit, and brightness upper limit) is previously adjusted. This adjustment processing is performed by utilizing the image imaged of the user prior to the start of the main part of the game. However, the adjustment processing described later may be executed at an important situation, such as a timing when the content (aspect, scene, etc.) of the game is changed as well as the preinitiation of the main part of the game.

For example, prior to the start of the main part of the game, an adjustment screen 300 shown in FIG. 10 (A) is displayed on the first LCD 16. On the adjustment screen 300, a facial index (face shape index) 302 for designating a position and a size to display an image (facial image) obtained by imaging the face of the user and a hand index (hand shape index) 304 for designating a position and a size to display an image (hand image) obtained by imaging the hand of the user are displayed.

Figure 11:
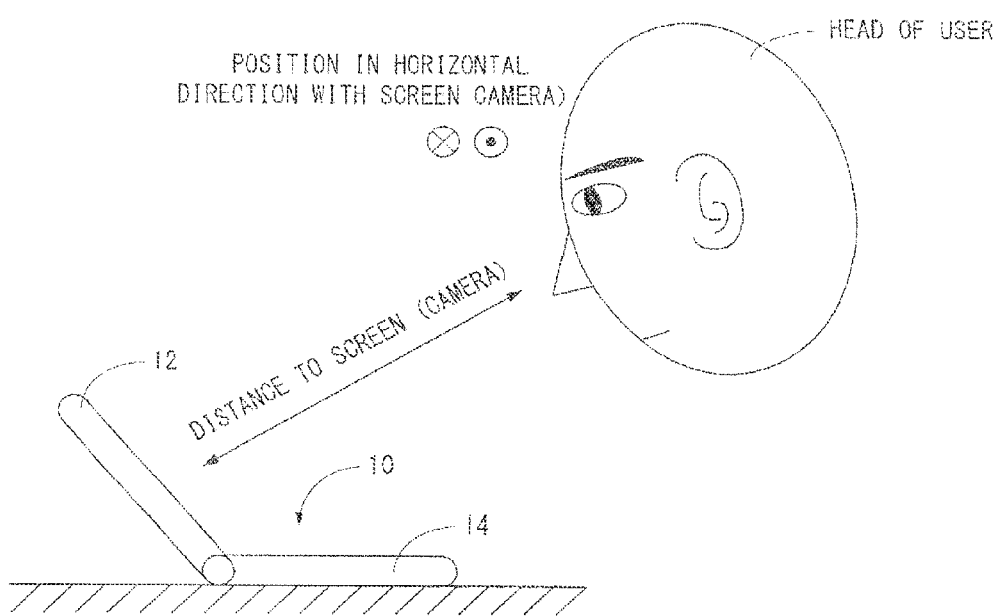
FIG. 11 is an illustrative view showing a positional relationship between a head (face) of the user and the game apparatus in a case that the virtual game of this embodiment is played.

In a case of playing the virtual game of this embodiment, the user puts the game apparatus 10 on a board such as a table, and tilts the upper housing 12 with respect to a horizontal plane (lower housing 14) as shown in FIG. 11. Accordingly, the user adjusts the distance (position in forward and backward directions) between the face (head) of the user or the every part of the body and the game apparatus 12 (inward camera 32) and the position in the right and left direction (horizontal direction), and also adjusts a position of the face (head) in the upward and downward direction and the inclination of the face (head) such that the facial image of the user himself or herself imaged by the inward camera 32 is fit into the face shape index 302. Although illustration is omitted, similarly, the user adjusts the distance (position in forward and backward directions) between the right hand of the user and the game apparatus 12 (inward camera 32) and the position in a horizontal direction, and also adjusts the position of the right hand in the upward and downward directions and the inclination of the palm of the right hand such that the image of the right hand (palm) of himself or herself imaged by the inward camera 32 is fit into the hand shape index 304.

By utilizing such an adjustment screen 300, the game apparatus 10 executes a ceremonial imaging of the user, and acquires a plurality number of imaged images (3-4 sheets in this embodiment). In this embodiment, an imaging timing is instructed according to a voice guidance from the game apparatus 10, and an imaged image at the imaging timing and imaged images for each several frames until approximately one second before the imaging timing are acquired. More specifically, a message saying that a ceremonial imaging is to be performed is output from the speaker of the game apparatus 10, and then, a sound to count down and a shutter sound, such as "3, 2, 1, pashya" is output from the speaker. Here, in this embodiment, in order to acquire a plurality of imaged images, during a time from when "1" is counted down to when a shutter operation is executed, the imaged image from the inward camera 32 is reserved in the memory for saved data 56 for each four frames (frame: screen updating unit (1/60 seconds), for example. That is, one second corresponds to about 16 frames, so that three to four sheets of imaged images are acquired. By utilizing the data of the plurality of imaged image (hereinafter referred to as "image data for evaluation"), the above-described adjustment of the threshold value is executed. It should be noted that the threshold value adjusting processing and skin color extracting processing described later as well as the skin color determining processing are executed by the CPU 50.

In the threshold value adjusting processing, an initial value (static) is first given to each threshold value. With respect to the first image data for evaluation, initial values according to a threshold value table for skin color determination shown in FIG. 12 are given, but with respect to the image data for evaluation at the next time and thereafter, threshold values (optimal values) converged until the previous adjustment processing are given as initial values. Furthermore, as can be understood from FIG. 12, a maximum value and a minimum value (both are static) of the threshold value which are changeable by the adjustment processing are set by being brought into correspondence with each of the initial values.

Here, with respect to the hue, the processing is performed by values taken by converting the angle of 360 into 256 (being equal to or more than 0 and less than 256) levels. Furthermore, the hue is circulated, and therefore, 0 and 256 are equivalent to each other. Thus, in a case that the initial values of the hue are as shown in FIG. 12, the hue lower limit is 220, and the hue upper limit is 25, so that the extraction range as a skin color becomes 220, 221, 222, . . . , 254, 255, 0, 1, . . . , 24, 25.

Additionally, since the condition has to be satisfied with respect to saturation and brightness as well as the hue, if all of the hue, the saturation and the brightness fall within the extraction range, it is determined to be a skin color.

Furthermore, data corresponding to a predetermined pose, that is a figure in which the face and the palm of the right hand fit into the face shape index 302 and the hand shape index 304 displayed on the adjustment screen 300 shown in FIG. 10(A) (hereinafter referred to as "data for determination") in this embodiment is statically held. For example, the data for determination is loaded from the memory card 28 attached to the game apparatus 10, and stored in the main memory 52. More specifically, the data for determination is data (accuracy data for each two dots) indicating to which attributes each pixel of the first LCD 16 belongs, A, B, C. Here, the attribute A means that the pixel should be the skin color, the attribute B means that the pixel should not be the skin color, and the attribute C means that the pixel may be either color (is irrelevant to the evaluation).

Returning to FIG. 10(B), a distribution of pixels discriminated from the attribute A, the attribute B and the attribute C is shown in a case that an imaged image is displayed on the adjustment screen 300 shown in FIG. 10(A). The pixels represented by the attribute A are shown by an area 310. The pixels represented by the attribute B are shown by an area 312. The pixels represented by the attribute C are shown by an area 314 except for the area 310 and the area 312 out of the display region of the first LCD 16.

With respect to the image data for evaluation, for each 2×2 pixel matrix, by referring to the data for determination of the corresponding pixels, two values Q, R are calculated, and an evaluated value Xcrt is calculated from these values Q, R. Here, the value Q is the number of matrixes for which the pixels of the image data for evaluation which are noted are the skin color, and each of the data for determination of the corresponding pixels indicates the attribute A. In other words, the value Q is the number of matrixes for which a good evaluation indicating that the skin color is correctly extracted is obtained. On the other hand, the value R is the number of matrixes for which the pixels of the image data for evaluation which are noted are the skin color, but each of the data for determination of the corresponding pixels indicates the attribute B. In other words, it is the number of matrixes for which a bad evaluation, such as a noise, an erroneous extraction is obtained. Then, an evaluated value Xcrt is a value obtained by subtracting the value R form the value Q, and it can be said that as the value Xcrt is large, the skin color can be extracted more correctly.

Such evaluation is performed by setting each threshold value to the reference value with respect to the first image data for evaluation. Then, the evaluated values Xcrt corresponding to the threshold values are stored (temporarily stored) identifiably in the main memory 52. Next, evaluations when each threshold value is set to the minimum value and the maximum value are made for each threshold value.

For example, the threshold value of the hue lower limit is set to the minimum value shown in FIG. 12, and an evaluated value Xmin is calculated as described above. It is determined whether or not the evaluated value Xmin is above a previous evaluated value Xpre (evaluated value Xcrt, here). If the evaluated value Xmin is above the previous evaluated value Xpre, it is determined that the direction of the adjustment is correct, and an intermediate value between the current threshold value and the current optimal value (reference value here) is set as a new threshold value. The above-described evaluation is performed again, and the more highly valued threshold value out of the two is adopted as an optimal value. That is, the threshold value is set to the minimum value or the intermediate value between the minimum value and the current optimal value (reference value, here).

On the other hand, if the evaluated value Xmin is below the previous evaluated value Xpre, it is determined that the direction of the adjustment is converse, the threshold value of the hue lower limit is set to the maximum value shown in FIG. 12, and an evaluated value Xmax is calculated as described above. It is determined whether or not the evaluated value Xmax is above the previous evaluated value Xpre (evaluated value Xcrt, here). If the evaluated value Xmax is above the previous evaluated value Xpre, an intermediate value between the current threshold value and the current optimal value is set as a new threshold value. The above-described evaluation is performed again, and the more highly valued threshold value out of the two is adopted as an optimal value. However, if the evaluated value Xmax is also below the previous evaluated value Xpre, it is determined that the original threshold value is the optimal value, and the threshold value is not changed.

With respect to the rest of the hue upper limit, the saturation lower limit, the saturation upper limit, the brightness lower limit, and the brightness upper limit, each of the threshold value is adjusted (selected) according to the aforementioned procedure. Furthermore, with respect to the image data for evaluation at the next time and thereafter, the threshold values (optimal value) selected (converged) until the previous process are given as initial values. Then, the adjustment processing is performed with respect to all the image data for evaluation, and the threshold values (optimal values) finally selected are utilized in skin color extracting processing to be explained next.

Accordingly, in this embodiment, by utilizing the photograph image obtained by imaging the player prior to the start of the game, the threshold values for determining the skin color of the player in the current environment (sunlight condition, etc.) is adjusted. This makes it possible to correctly detect the skin color during the game.

Furthermore, in this embodiment, the threshold value adjusting processing is executed by utilizing the plurality of imaged images. This makes it possible to correctly adjust the threshold values. Furthermore, evaluation processing with respect to the n+1-th imaged image is performed based on the threshold value optimized by the n-th imaged image. This makes it possible to effectively adjust the threshold values.

In addition, in this embodiment, the threshold values are adjusted with respect to each of the hue, the saturation, and the brightness, and therefore, it is possible to accurately set the threshold values in the environment at this time. However, only the hue and the saturation may be adjusted, or only the hue and the brightness may be adjusted.

Furthermore, since the region which should not be a skin color is determined as well as the region which should be a skin color, it is possible to accurately set the threshold values.

As described above, in a case that the skin color is extracted, data for skin color extracting processing is first constructed from the image (imaged image) imaged by the inward camera 32. Here, the imaged image is acquired by an API in an RGB (each component is 5 bits) form. It should be noted that the imaged image is constructed of 256×192 dots the same as that of the first LCD 16.

Figure 14:
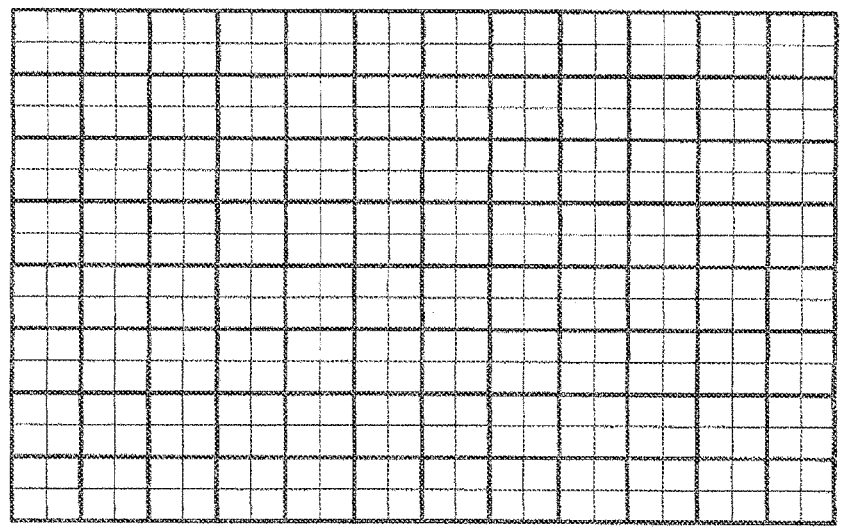
FIG. 14 is an illustrative view showing matrixes in a case that the display region of the first LCD is divided into 2×2 pixels.

The data for skin color extracting processing (data for extracting processing) is generated in correspondence with regions of an 8×8 pixel matrix, a 4×4 pixel matrix, and a 2×2 pixel matrix. In this embodiment, since the display region of the first LCD 16 is 256×192 dots, in a case that this display region is divided into the region of the 8×8 pixel matrix, 32×24 pixel matrixes are generated. FIG. 13(A) shows a case that the display region is divided into the 8×8 pixel matrixes. In FIG. 13(A) (this is true for FIG. 13(B), FIG. 14), each of the 8×8 pixel matrix is represented by a heavy-line. It should be noted that in FIG. 13(A) (this is true for FIG. 13(B), FIG. 14), for simplicity, the display region of the first LCD 16 is represented by 24×16 pixels. Furthermore, in FIG. 13 and FIG. 14, the smallest cell (quadrangle frame) is equivalent to one pixel (dot). Similarly, in a case that the display region is divided into the region of the 4×4 pixel matrix, 64×48 matrixes are generated. FIG. 13(B) shows an example that display region is divided into the 4×4 pixel matrixes. In addition, in a case that the display region is divided into the region of the 2×2 pixel matrix, 128×96 matrixes are generated. FIG. 14 shows an example that the display region is divided into the 2×2 pixel matrixes.

The data for extracting processing indicates information on an evaluated value (different from the above-described evaluated value), a status value and a color value. The evaluated value is a value indicating skin color-likeness and constructed by 8 bit data. In this embodiment, the evaluated value takes values 0-64 and 255. Here, 0-64 indicates the skin color-likeness, and 255 means invalidity. Furthermore, the larger the evaluated value is, the more the region means to be likely to the skin color.

The status value is data for holding the content (state) determined by each processing described later and is shown by 16 bit data. More specifically, the status value is indicated by one bit information showing whether the skin color or not, 8 bit information showing whether or not each of the surrounding 8 matrixes is the skin color, one bit flag for forcedly regarding the own matrix as being a skin color, and one bit flag for forcedly regarding the own matrix as not being a skin color, being added with extra 5 bits.

The color value is 16 bit data and shown by RGB 555 format, and is data in which each of RGB is indicated by 5 bit tone, and an extra one bit is added. Here, when whether the skin color or not is evaluated with respect to the imaged image as a unit of matrix, the color value (RGB 555 form) is converted into brightness, hue and saturation so as to be used.

Next, generation of the data for extracting processing is explained. By processing 1, a color value is first prepared with respect to each 2×2 pixel matrix. In this embodiment, the processing 1 is processing for calculating an average value of the color values of the four cells or pixels included in the 2×2 pixel matrix. Because of 2×2 pixel matrix here, each of the four cells included in the 2×2 pixel matrix corresponds to one pixel.

In this embodiment, in the processing 1, the average value of the color values of the four cells included in the matrix is calculated, but out of the four cells, the color value at the upper left may be adopted.

Next, a color value is prepared with respect to each 4×4 pixel matrix. In addition, a color value is prepared with respect to each 8×8 pixel matrix according to the processing 1. In a case that the display region is divided into 4×4 pixel matrixes, each of the four matrixes (small) included in a 4×4 matrix (large) means a 2×2 pixel matrix. Furthermore, if the display region is divided into 8×8 pixel matrixes, each of the four matrixes (small) included in the 8×8 pixel matrix (large) means a 4×4 pixel matrix.

Succeedingly, the color value of each 8×8 pixel matrix is corrected according to processing 2. In this embodiment, in the processing 2, an intermediate value of the brightness values based on the color values is calculated with respect to the nine 8×8 pixel matrixes including its own matrix and the eight surrounding matrixes, and the color value of the matrix with the intermediate value is changed to the color value of its own matrix.

Here, with respect to the surrounding matrixes, the correction of the color values is invalidated. Furthermore, in this embodiment, in the processing 2, the intermediate value of the brightness values on the basis of the color values is evaluated with respect to the nine matrixes in total including its own matrix and the eight surrounding matrixes, and the color value of the matrix with the intermediate value is changed (corrected) to the color value of its own matrix, but the color value may not be corrected.

Next, the status value is initialized with respect to each 8×8 pixel matrix according to the processing 3. In this embodiment, in the processing 3, it is determined whether or not each matrix is a skin color on the basis of the threshold values adjusted by the above-described threshold value adjusting processing, and the determination is reflected on the status value. More specifically, as described above, it is determined whether each of the brightness, hue and saturation is within or out of the range of the threshold values on the basis of the color value that are thus prepared and corrected.

Succeedingly, the evaluated value is initialized with respect to each 8×8 pixel matrix according to processing 4. In this embodiment, in the processing 4, weighting is performed on the basis of the status values of the surrounding matrixes, and the weighted values are reflected on the evaluated value. More specifically, assuming that the matrix for which the determination result based on the threshold value is within the threshold value is "1", and assuming that the matrix for which the determination result based on the threshold value is out of the threshold value is "0", by multiplying each of the values of the corresponding matrix with a weighting factor and summing up the weighted values, the evaluated value of the central matrix is calculated. Where the weighting factor for each matrix is Wi (i is a number applied to a matrix: 1-9), and the determination result according to the threshold value for each matrix is Hi, the evaluated value Y of the central matrix is evaluated according to Equation 15.

$$Y=W1*H1+W2*H2+W3*H3+W4*H4+W5*H5+W6*H6+W7*H7+W8*H8+W9*H9 \quad \text{[Equation 15]}$$

In this embodiment, as shown in FIG. 15(A), taking its own matrix as a center, its own matrix and the surrounding 8 matrixes are weighted. Here, the total sum of the weighted values is "64". More specifically, with respect to matrixes (1), (3), (7) and (9), the weighting factor "0" is set, with respect to matrixes (2), (4), (6), (8), the weighting factor "10" is set, and with respect to a matrix (5), that is, its own matrix, the weighting factor "24" is set.

Furthermore, FIG. 15(B) shows an example of the determination result (result of the processing 3) of each of the matrixes based on the threshold value. In FIG. 15(B), "◯" is applied to the matrixes (3), (5), (6), (8) for each of which the determination result based on the threshold value is within the range of the threshold value, and "x" is applied to the matrixes (1), (2), (4), (7), (9) for each of which the determination result based on the threshold value is out of the range of the threshold value.

Accordingly, in examples shown FIG. 15(A) and FIG. 15(B), the evaluated value Y at the central matrix is calculated as shown in Equation 16 according to the Equation 15.

$$Y=0*0+10*0+0*1+10*0+24*1+10*1+0*0+10*1+0*0=44 \quad \text{[Equation 16]}$$

Thus, the evaluated value Y is initialized. When the evaluated value Y is initialized, the evaluated value is corrected with respect to each 8×8 pixel matrix according to processing 5. In this embodiment, the processing 5 corrects the status value of the central matrix on the basis of the evaluated values Y of the adjacent matrixes, and reflects the resultant on the evaluated value of the central matrix.

More specifically, if each of the evaluated values Y of the surrounding eight matrixes is equal to or more than 20, it is considered that the surrounding (peripheral) matrixes are satisfied with the skin color, and irrespective of the initialized evaluated value Y of its own matrix, the evaluated value Y of its own matrix is regarded as being a skin color as well. That is, in the status value, the flag for forcedly regarding its own matrix as being a skin color is turned on.

On the other hand, if each of the evaluated values Y of the surrounding eight matrixes is less than 20, it is considered that the surrounding (peripheral) matrixes are not a skin color, and irrespective of the initialized evaluated value Y of its own matrix, the evaluated value Y of its own matrix is regarded as not being a skin color as well. That is, in the status value, the flag for forcedly regarding its own matrix as not being a skin color is turned on.

It should be noted that the processing 5 is performed on each 4×4 pixel matrix and 2×2 pixel matrix described later, but in a case that a matrix is forcedly regarded as being a skin color or in a case that a matrix is forcedly regarded as not being a skin color at an upper level (larger matrix), the result in that level has a priority to the result at the lower level.

When the processing 5 is executed on each 8×8 pixel matrix to correct the status value, processing 6 is executed to initialize the status value of each 4×4 pixel matrix. That is, the status value of each 8×8 pixel matrix is set to an initial value of the status value of each of the 4×4 pixel matrixes included therein.

Next, with respect to each 4×4 pixel matrix, the evaluated value is initialized according to the processing 4. The processing 4 is as described above, and therefore, the duplicated explanation is omitted. The same holds true below. In addition, the status value is corrected with respect each 4×4 pixel matrix according to the processing 5, and the corrected value is reflected on the evaluated value Y, and the status value of each 2×2 pixel matrix is initialized according to the processing 6. That is, the status value of each 4×4 pixel matrix is set to an initial value of the status value of each of the 2×2 pixel matrixes included therein.

Succeedingly, with respect to each 2×2 pixel matrix, the evaluated value is initialized according to the processing 4.

Then, the status value is corrected with respect to each 2×2 pixel matrix according to the processing 5, and the corrected value is reflected on the evaluated value Y. Accordingly, by referring to the status value in a unit of 2×2 pixel matrix, it is possible to detect whether the skin color or not.

Thus, in this embodiment, out of the image obtained by imaging, with respect to each of the divided images (each matrix) of a relatively large size A (8×8 in the above-described example), determination processing as to whether a skin color or not, specifically, processing for determining whether each of the brightness, the hue and the saturation of the color value is within the fixed range (the same is true below) is executed, and with respect to each matrix of the size A, the determination result ("status value" in the above-described example) is generated. Then, with respect to each matrix of a relatively small size B (4×4 in the above-described example), the processing is performed. More specifically, by means of the determination result of each matrix of the size A, the determination result of each matrix of the size B is set (above-described processing 6). Thus, there is no need of performing skin color determination processing with respect to each matrix of the small size. Then, the determination result of each matrix of the size B is corrected by utilizing the determination results of the surrounding matrixes (above-described processing 4, processing 5). Thus, the determination result is changed in a unit of the size B smaller in size, so that it is possible to generate the determination results with a high resolution.

Furthermore, in this embodiment, in the matrix of the relatively large size A, with respect to the matrix having a high probability of being a skin color, that is, a matrix for which a "one bit flag for forcedly regarding its own matrix as being a skin color" is set (turned on) in the above-described example, even if the matrix is determined not to be a skin color in the matrix of the smaller size B included in the matrix of the size A, all the matrixes of the size A are determined to be a skin color. Thus, it is possible to reduce noise. Furthermore, similarly, in the matrix of the relatively large size A, with respect to the matrix having a low probability of being a skin color, that is, a matrix for which a "one bit flag for forcedly regarding its own matrix as not being a skin color" is set (turned on) in the above-described example, even if the matrix is determined to be a skin color in the matrix of the smaller size B, all the matrixes of the size A are determined not to be a skin color. Thus, it is possible to reduce noise.

Figure 16:
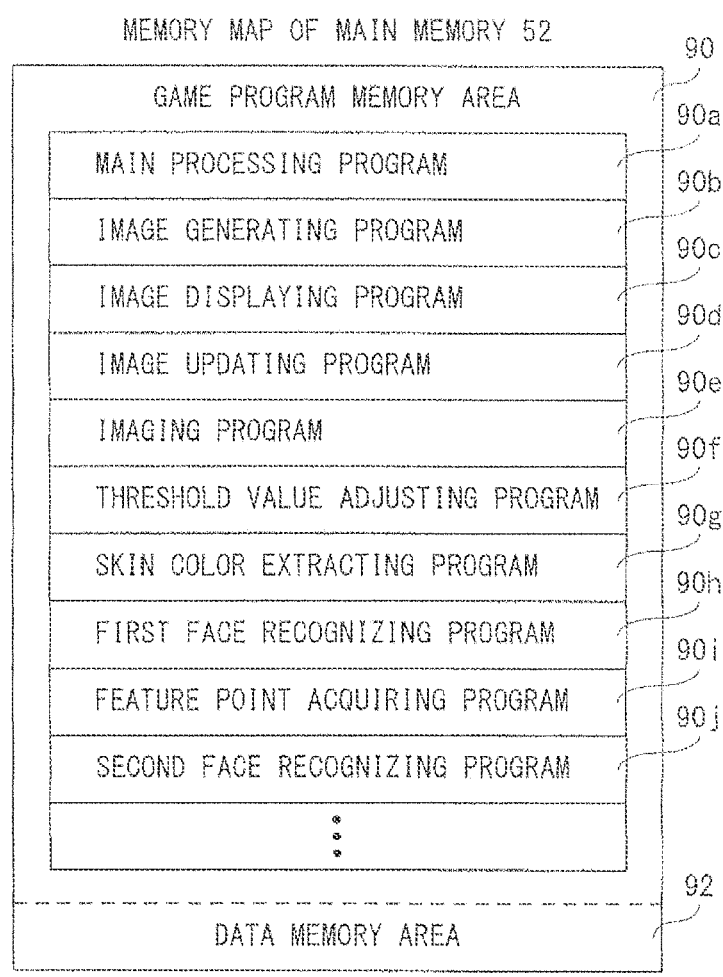
FIG. 16 is an illustrative view showing a memory map of a main memory shown in FIG. 3.

FIG. 16 shows an illustrative view showing one example of a memory map of the main memory 52. As shown in FIG. 16, the main memory 52 includes a game program memory area 90 and a data memory area 92. The game program memory area 90 stores a game program, and the game program is made up of a main processing program 90a, an image generating program 90b, an image displaying program 90c, an image updating program 90d, an imaging program 90e, a threshold value adjusting program 90f, a skin color extracting program 90g, a first face recognizing program 90h, a feature point acquiring program 90i, a second face recognizing program 90j, etc.

The main processing program 90a is a program for executing main processing of the virtual game of this embodiment. The image generating program 90b is a program for generating a game image to display a screen necessary for the game, such as a game screen (100, 200, etc.) and an operation screen on the first LCD 16 or the second LCD 18 by utilizing image data 92a described later. The image displaying program 90c is a program for displaying the game image generated according to the image generating program 90b on the first LCD 16 or the second LCD 18. The image updating program 90d is a program for updating a game screen (game image) displayed on the first LCD 16 or the second LCD 18. The imaging program 90e is a program for imaging an object with the inward camera 32 or the outward camera 34 according to an instruction by the user and an event of the game. This camera is similar to the general digital cameras, and therefore, the detailed explanation is omitted, but when a camera (imaging) mode is set, a real-time moving image (through image) is captured, and the through image is displayed on the first LCD 16 or the second LCD 18 which is used as a view finder. According to a shutter operation by the user or a game event, an imaged image of the still image is captured, and the corresponding imaged image data is stored in the memory for saved data 56.

The threshold value adjusting program 90f is a program for adjusting the threshold values of the hue, the saturation, and the brightness for the skin color determination to optimal values on the basis of the imaged image in the skin color extracting processing prior to the main part of the virtual game. The skin color extracting program 90g is a program for extracting the skin color in a unit of 2×2 pixel matrix from the imaged image. The first face recognizing program 90h is for determining whether or not a ratio of the skin color region to the specific region (110, 110') previously set is above a predetermined value (35%) on the basis of the information on the skin color extracted from the skin color extracting program 90g, and determining that the face of the user is correctly recognized in a case that it is above the predetermined value.

The feature point acquiring program 90i is a program for acquiring 55 feature points Pi of the facial image of the user by performing image processing, such as edge detection, etc. on the imaged image imaged by the inward camera 32 at regular time intervals (10 frames, for example). The second face recognizing program 90j is a program for recognizing the entire portion of the face of the user, a part of the face of the user (mouth, eyes in this embodiment) or its movement (opening or closing of the mouth in this embodiment) on the basis of the feature points Pi obtained according to the feature point detecting program 90i.

Although illustration is omitted, the game program memory area 90 stores a sound output program, a backup program, etc. The sound output program is a program for generating and outputting a sound necessary for the game, such as a voice or an onomatopoeic sound of an object, a sound effect, BGM and the like. The backup program is a program for storing (saving) game data (proceeding data, result data) stored in the main memory 52 in the memory card 26.

FIG. 17 is an illustrative view showing a detailed content of the data memory area 92 shown in FIG. 16. As shown in FIG. 17, the data memory area 92 stores image data 92a, imaged data 92b, feature point data 92c, upper lip extracted coordinate data 92d, lower lip extracted coordinate data 92e, left eye extracted coordinate data 92f, right eye extracted coordinate data 92g, lips difference data 92h, eyes difference data 92i, set threshold value data 92j, data for determination 92k, hue threshold value data 92m, saturation threshold value data 92n, brightness threshold value data 92p, etc.

The image data 92a is polygon data and texture data, etc. for generating a game image. The imaged data 92b is data of the imaged image imaged by the inward camera 32 or the outward camera 34 (imaged image data), and is read by the memory for saved data 56 and is stored (temporarily stored) in the main memory 52. In this embodiment, a plurality of sheets of image data (4 sheets, for example) can be stored. The feature point data 92c is coordinate data corresponding to each of the feature points Pi acquired according to the feature point detecting program 90i as described above, and updated at regular time intervals (every 10 frames).

The upper lip extracted coordinate data 92d is coordinate data on a midpoint of the upper lip LipU calculated on the basis of the feature points Pi as described above. The lower lip extracted coordinate data 92e is coordinate data on a midpoint of the lower lip LipD calculated on the basis of the feature points Pi as described above. The left eye extracted coordinate data 92f is coordinate data on a midpoint of the left eye EyeL calculated on the basis of the feature points Pi as described above. The right eye extracted coordinate data 92g is coordinate data on a midpoint of the right eye EyeR calculated on the basis of the feature points Pi as described above.

The lips difference data 92h is data on the difference of the lips (Lip_dX, Lip_dY) between the aforementioned midpoint of the upper lip LipU and midpoint of the lower lip LipD for each of the axial directions. The eyes difference data 92i is data on the difference of the eyes (Eye_dX, Eye_dY) between the aforementioned midpoint of the left eye EyeL and midpoint of the right eye EyeR for each of the axial directions.

The set threshold value data 92j is data on the table of the threshold values for skin color determination shown in FIG. 12 and data generated by the programmer, et al. in advance. The data for determination 92k is data for defining the areas 310, 312, 314 respectively corresponding to the attributes A, B, C explained by means of FIG. 10(B).

The hue threshold value data 92m is numerical value data of an optimal value as to the threshold value of the hue adjusted according to the above-described threshold value adjusting program 90f. Similarly, the saturation threshold value data 92n is numerical value data of an optimal value as to the threshold value of the saturation adjusted according to the above-described threshold value adjusting program 90f. Also, the brightness threshold value data 92p is numerical value data of an optimal value as to the threshold value of the brightness adjusted according to the above-described threshold value adjusting program 90f.

Although illustration is omitted, the data memory area 92 stores other data, such as sound data, or is provided with a counter (timer) and a flag, etc. necessary for game processing.

Figure 18:
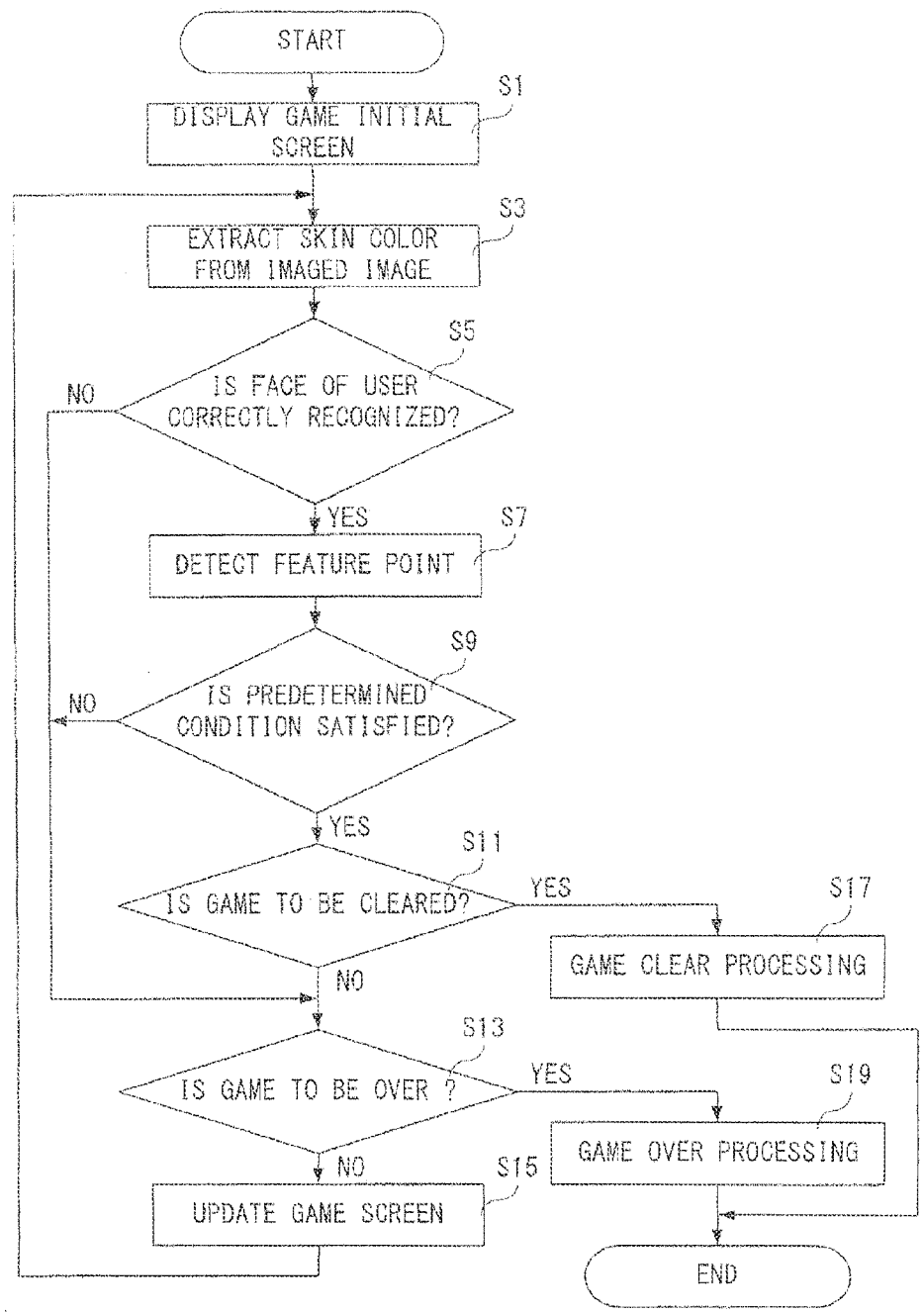
FIG. 18 is a flowchart showing game processing of a CPU shown in FIG. 3.

More specifically, the CPU 50 shown in FIG. 3 executes game processing shown in FIG. 18. Although illustration is omitted, prior to the game processing (main part) shown in FIG. 18, the above-described threshold value adjusting processing is executed. Although illustration is omitted, at the same time or approximately at the same time of the start of the adjustment processing, imaging processing by the inward camera 32 is started. In addition, although illustration is omitted, when the game processing is started, feature point Pi acquiring processing is executed at regular time intervals (10 frames). These processing is executed by multitasking.

As shown in FIG. 18, when starting the game processing, the CPU 50 displays a game initial screen in a step S1. For example, the game screen 100 shown in FIG. 4(A) and the game screen 300 shown in FIG. 8(A) are displayed on the first LCD 16, for example. This is different depending on the game played by the user. In a succeeding step S3, a skin color is extracted from the imaged image. Here, as described above, a skin color is extracted from the imaged image corresponding to the latest imaged image data included in the imaged data 92b.

In a next step S5, it is determined whether or not the face of the user is correctly recognized. More specifically, by utilizing the result extracted in the step S3, it is determined whether or not the skin color region in the specific region (110, 110') is above the predetermined ratio (35%). If "NO" in the step S5, that is, if the skin color region in the specific region (110, 110') is equal to or less than the predetermined ratio, it is determined that the face of the user cannot be correctly recognized, and then, the process proceeds to a step S13.

On the other hand, if "YES" in the step S5, that is, if the skin color region is above the predetermined ratio in the specific region (110, 110'), it is determined that the face of the user is correctly recognized, and in a step S7, the feature points Pi are detected. Here, the CPU 50 detects the feature point data 92c stored in the data area 92. Succedingly, in a step S9, it is determined whether or not a predetermined condition is satisfied. Here, the CPU 50 determines whether or not the mouth of the user is opened, and determines whether or not a state in which the face of the user (eyes) is not recognized shifts to a sate in which the face (eyes) is recognized, on the basis of the feature points Pi. Such a determination is different from one game to another. Furthermore, in the example of the above-described virtual game, a virtual game recognizing the entire face is not explained, but game processing of determining whether or not a predetermined condition is satisfied based on all the feature points Pi (entire face) can be executed. That is, the CPU 50 determines whether or not a predetermined condition is satisfied in accordance with the entire face of the user being recognized, and a part of the face of the user or its movement being recognized.

If "NO" in the step S9, that is, if the predetermined condition is not satisfied, the process directly proceeds to the step S13. On the other hand, if "YES" in the step S9, that is, if the predetermined condition is satisfied, it is determined whether or not the game is to be cleared in a step S11. Here, the CPU 50 determines whether or not a condition of the game clear is satisfied. For example, in the above-described virtual game, example of the condition of the game clear is that a loaf of bread is eaten within a time limit, and a "peek-a-boo" motion is successful within a time limit.

If "YES" in the step S11, that is, if the game is to be cleared, game clear processing is executed in a step S17, and then the game processing is ended. For example, in the step S17, various dramatic effects are performed such as a display of the game screen representing the game is cleared, an output of a sound effect, addition of a point, level up of the game and the like.

On the other hand, if "NO" in the step S11, that is, if the game is not be cleared, it is determined whether or not the game is to be over in the step S13. Here, the CPU 50 determines whether or not the condition of the game over is satisfied. For example, in the above-described virtual game, the game over condition is that a loaf of bread cannot be eaten within the time limit and that a "peek-a-boo" motion is unsuccessful within a time limit.

If "NO" in the step S13, that is, if the game is not to be over, in order to continue the game, the game screen (100, 200) is updated in a step S15, and then, the process returns to the step S3. Although the detailed explanation is omitted, in a case that it is determined that the predetermined condition is satisfied in the step S9, the game screen is updated so as to clearly show the progress of the game by displaying a game screen 100 showing that the lip object 102 bites the bread object 104, and, if it is detected that the user covers his or her face with the hands, by displaying a motion to be executed by the user next (releasing his or her hands which cover the face) in the designation image displaying area 206, etc, for example. On the other hand, if "YES" in the step S13, that is, if the game is to be over, game over processing is executed in a step S19 to end the game process. For example, in the step S19, a dramatic effect is executed by displaying a game screen representing a game over, outputting a sound effect, reducing a life of the player or the player character, and the like.

According to this embodiment, a skin color is extracted from the imaged image, then, whether or not the face of the user is recognized is determined on the basis of the extracted skin color, and so long as the face of the user is recognized, the predetermined condition is satisfied on the basis of the feature points of the face of the user. Thus, it is possible to make the user play the game in a playing state that the programmers and the developers intend, it is possible to execute an operation intended by the player, and it is also possible to correctly determine whether or not the predetermined condition is satisfied.

Here, in this embodiment, the virtual game in which on the basis of the feature points of the face, whether or not the face of the user is recognized is determined, and whether or not the user opens or closes the mouth, whether or not the predetermined condition is satisfied is determined is explained, but there is no need of being restricted thereto. For example, it may be possible to execute a virtual game in which by determining whether or not a predetermined facial expression, such as a smiling face, an angry face, etc. is detected on the basis the feature points of the eyebrows and the feature points of the eyes, whether or not a predetermined condition is satisfied is determined.

Furthermore, in this embodiment, a specific region where the face of the user seems to exist is set for the purpose of requiring a high accuracy, and in a case that a ratio of a skin color region to the specific region is above the predetermined value, the face of the user is recognized. However, the face of the user may be recognized on the basis of a ratio of the skin color region to the entire display region of the LCD.

Additionally, in this embodiment, by displaying the silhouettes on the game screen, the skin color region recognized by the game apparatus is notified to the user, but there is no need of being restricted thereto. By a display of an index as to whether or not the face (skin color region) is recognized, and, if a face is recognized, an adequateness of the size (distance between the face and the game screen (inward camera)) with a bar graph, and the like on the game screen, the user may be notified.

In addition, the configuration of the game apparatus is not restricted to that of this embodiment. For example, one display (LCD) and one camera may be appropriate. Or, the touch panel may not be set. Alternatively, a touch panel may be provided on the two LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium comprising game program instructions, the game program instructions, when executed by a processing system, causing the processing system to:

acquire a first user image captured by a camera before starting a game processing;
generate user feature data indicating a feature of a user based on the first user image;
store the user feature data;
acquire a second user image captured by the camera after starting the game processing;
determine whether or not the second user image includes the feature of the user by comparing the second user image with the stored user feature data; and
execute the game processing based on the second user image when the second user image includes the feature of the user, execution of the game processing including, at least, determining whether a game clearing condition is satisfied based on the second user image, the second user image being obtained repeatedly during execution of the game processing.

2. The non-transitory computer readable storage medium according to claim 1, wherein the feature of the user is a skin color feature of the user.

3. The non-transitory computer readable storage medium according to claim 1, wherein the game processing is executed based on facial feature data indicating one or more facial features of the face of the user, the facial feature data being calculated based on the second user image.

4. The non-transitory computer readable storage medium according to claim 1, wherein a motion of the user is determined to be successful when the second user image satisfies a predetermined condition.

5. The non-transitory computer readable storage medium according to claim 1, wherein a motion of the user is determined not to be successful when the second image does not include the feature of the user even if the second user image satisfies a predetermined condition.

6. A non-transitory computer readable storage medium comprising game program instructions, the game program instructions, when executed by a processing system, causing the processing system to:

acquire an image captured by a camera, the image corresponding to an entire or a part of a face of a user;
extract a skin color from the image;
recognize one or more facial features of the face of the user on the basis of image data indicating the image;
determine if a positional relationship of a screen and/or a camera of the apparatus and the face of the user is proper based on the extracted skin color; and
execute game processing using at least the one or more recognized facial features of the face of the user and/or the extracted skin color when the positional relationship of the screen and/or the camera of the apparatus and the face of the user is proper, execution of the game processing including, at least, determining whether a game clearing condition is satisfied based on the image, the image being obtained repeatedly during execution of the game processing.

7. A game apparatus comprising a processing system having at least one processor, and a camera, the processing system configured to:

acquire a first user image captured by the camera before starting a game processing;
generate user feature data indicating a feature of a user based on the first user image;
store the user feature data;
acquire a second user image captured by the camera after starting the game processing;

determine whether or not the second user image includes the feature of the user by comparing the second user image with the stored user feature data; and execute the game processing based on the second user image when the second user image includes the feature of the user, execution of the game processing including, at least, determining whether a game clearing condition is satisfied based on the second user image, the second user image being obtained repeatedly during execution of the game processing.

8. A game system comprising a processing system having at least one processor, and a camera, the processing system configured to:

acquire a first user image captured by a camera before starting a game processing;

generate user feature data indicating a feature of a user based on the first user image;

store the user feature data;

acquire a second user image captured by the camera after starting the game processing;

determine whether or not the second user image includes the feature of the user by comparing the second user image with the stored user feature data; and execute the game processing based on the second user image when the second user image includes the feature of the user, execution of the game processing including, at least, determining whether a game clearing condition is satisfied based on the second user image, the second user image being obtained repeatedly during execution of the game processing.

9. A game controlling method, comprising:

acquiring a first user image captured by a camera before starting a game processing;

generating user feature data indicating a feature of a user based on the first user image;

storing the user feature data;

acquiring a second user image captured by the camera after starting the game processing;

determining whether or not the second user image includes the feature of the user by comparing the second user image with the stored user feature data; and executing the game processing based on the second user image when the second user image includes the feature of the user, execution of the game processing including, at least, determining whether a game clearing condition is satisfied based on the second user image, the second user image being obtained repeatedly during execution of the game processing.

* * * * *